US009104499B2

(12) United States Patent
Stubbs et al.

(10) Patent No.: US 9,104,499 B2
(45) Date of Patent: *Aug. 11, 2015

(54) SYSTEM FOR MINIMIZING RESOURCE LATENCY BETWEEN PROCESSOR APPLICATION STATES IN A PORTABLE COMPUTING DEVICE BY SCHEDULING RESOURCE STATE SET TRANSITIONS

(75) Inventors: Joshua H. Stubbs, Longmont, CO (US); Andrew J. Frantz, Superior, CO (US); Norman S. Gargash, Boulder, CO (US); Gabriel A. Watkins, San Diego, CA (US); Grady L. Caraway, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/291,767

(22) Filed: Nov. 8, 2011

(65) Prior Publication Data
US 2012/0291042 A1    Nov. 15, 2012

Related U.S. Application Data

(60) Provisional application No. 61/425,677, filed on Dec. 21, 2010, provisional application No. 61/544,927, filed on Oct. 7, 2011.

(51) Int. Cl.
*G06F 9/50* (2006.01)
*G06F 1/32* (2006.01)

(52) U.S. Cl.
CPC ............ *G06F 9/5094* (2013.01); *G06F 1/3203* (2013.01); *G06F 1/3206* (2013.01);
(Continued)

(58) Field of Classification Search
CPC .... G06F 1/3203; G06F 1/3206; G06F 1/3243; G06F 1/329; G06F 9/5094; Y02B 60/1239; Y02B 60/142; Y02B 60/144
USPC ................... 718/104; 713/300, 320, 323, 324
See application file for complete search history.

(56) References Cited

U.S. PATENT DOCUMENTS
5,461,266 A    10/1995    Koreeda et al.
5,692,197 A    11/1997    Narad et al.
(Continued)

FOREIGN PATENT DOCUMENTS
CN    101091398 A    12/2007
CN    101414271 A    4/2009
(Continued)

OTHER PUBLICATIONS
Benini L., et al., "A Survey of Design Techniques for System-Level Dynamic Power Management", Jun. 1, 2000, IEEE Transactions on Very Large Scale Integration (VLSI) Systems, IEEE Service Center, Piscataway, NJ, USA, p. 299 XP008057349, ISSN: 1063-8210 the whole document.
(Continued)

*Primary Examiner* — Meng An
*Assistant Examiner* — Abu Ghaffari
(74) *Attorney, Agent, or Firm* — Nicholas A. Cole

(57) ABSTRACT

Resource state sets corresponding to the application states are maintained in memory. A request may be issued for a processor operating in a first application state corresponding to the first resource state set to transition to a second application state corresponding to the second resource state set. A start time to begin transitioning resources to states indicated in the second resource state set is scheduled based upon an estimated amount of processing time to complete transitioning. A process is begun by which the states of resources are switched from states indicated by the first resource state set to states indicated by the second resource state set. Scheduling the process to begin at a time that allows the process to be completed just in time for the resource states to be immediately available to the processor upon entering the second application state helps minimize adverse effects of resource latency.

12 Claims, 19 Drawing Sheets

(52) U.S. Cl.
CPC ............. *G06F 1/329* (2013.01); *G06F 1/3243* (2013.01); *Y02B 60/1239* (2013.01); *Y02B 60/142* (2013.01); *Y02B 60/144* (2013.01)

(56) References Cited

U.S. PATENT DOCUMENTS

| | | | |
|---|---|---|---|
| 5,812,860 | A | 9/1998 | Horden et al. |
| 6,081,826 | A | 6/2000 | Masuoka et al. |
| 6,098,118 | A | 8/2000 | Ellenby et al. |
| 6,405,320 | B1 | 6/2002 | Lee et al. |
| 6,535,798 | B1 | 3/2003 | Bhatia et al. |
| 6,545,999 | B1 | 4/2003 | Sugita |
| 6,823,516 | B1 | 11/2004 | Cooper |
| 6,910,036 | B1 | 6/2005 | Shee |
| 7,062,302 | B2 | 6/2006 | Yamaoka |
| 7,089,430 | B2 | 8/2006 | Cooper |
| 7,389,436 | B2 * | 6/2008 | Osborn .......... 713/320 |
| 7,609,171 | B2 | 10/2009 | Haapoja et al. |
| 7,640,473 | B2 | 12/2009 | Kawasaki |
| 7,906,996 | B1 | 3/2011 | Fuks et al. |
| 7,941,682 | B2 | 5/2011 | Adams |
| 7,962,775 | B1 * | 6/2011 | Vaidyu et al. ........ 713/323 |
| 8,041,972 | B2 | 10/2011 | Jarosinski et al. |
| 8,099,731 | B2 | 1/2012 | Li et al. |
| 8,230,249 | B2 * | 7/2012 | Dasgupta et al. ........ 713/323 |
| 8,271,818 | B2 | 9/2012 | Blanding |
| 8,589,932 | B2 | 11/2013 | Bower, III et al. |
| 8,618,780 | B2 | 12/2013 | Mounier et al. |
| 8,683,476 | B2 | 3/2014 | Saxe et al. |
| 8,694,817 | B2 | 4/2014 | Hoffknecht et al. |
| 8,725,488 | B2 | 5/2014 | Hofmann et al. |
| 2003/0061383 | A1 * | 3/2003 | Zilka ............. 709/245 |
| 2003/0226043 | A1 | 12/2003 | Hicok |
| 2006/0031692 | A1 | 2/2006 | Kato et al. |
| 2006/0136756 | A1 | 6/2006 | Rothman et al. |
| 2006/0146769 | A1 | 7/2006 | Patel et al. |
| 2006/0206737 | A1 * | 9/2006 | Lee ............. 713/320 |
| 2007/0055795 | A1 | 3/2007 | Seo et al. |
| 2007/0232358 | A1 * | 10/2007 | Sherman ............ 455/560 |
| 2007/0290727 | A1 | 12/2007 | Jarosinski et al. |
| 2008/0052543 | A1 | 2/2008 | Sokorac |
| 2008/0091965 | A1 * | 4/2008 | Nychka et al. ........ 713/323 |
| 2009/0049314 | A1 | 2/2009 | Taha et al. |
| 2009/0249103 | A1 | 10/2009 | Jeyaseelan et al. |
| 2009/0307519 | A1 * | 12/2009 | Hyatt ............. 713/502 |
| 2009/0328046 | A1 | 12/2009 | Proctor et al. |
| 2010/0023732 | A1 * | 1/2010 | Triplett ........... 712/220 |
| 2010/0058087 | A1 | 3/2010 | Borras et al. |
| 2010/0095143 | A1 * | 4/2010 | Yamaji ............ 713/323 |
| 2010/0107166 | A1 | 4/2010 | Topaloglu |
| 2010/0115144 | A1 * | 5/2010 | Dubs et al. ........... 710/8 |
| 2010/0191814 | A1 | 7/2010 | Heddes et al. |
| 2010/0191992 | A1 * | 7/2010 | Shen et al. ......... 713/320 |
| 2010/0267407 | A1 * | 10/2010 | Liao et al. ......... 455/509 |
| 2010/0316099 | A1 | 12/2010 | Sugita et al. |
| 2010/0332876 | A1 | 12/2010 | Fields et al. |
| 2011/0119422 | A1 | 5/2011 | Grouzdev |
| 2011/0173470 | A1 | 7/2011 | Tran |
| 2011/0252251 | A1 | 10/2011 | De Cesare et al. |
| 2011/0307891 | A1 | 12/2011 | Orr et al. |
| 2012/0084589 | A1 | 4/2012 | Millet et al. |
| 2012/0110351 | A1 * | 5/2012 | Raju et al. ........ 713/300 |
| 2012/0159222 | A1 | 6/2012 | Frantz et al. |
| 2012/0284729 | A1 | 11/2012 | Sharda et al. |
| 2012/0291043 | A1 | 11/2012 | Stubbs et al. |
| 2013/0007492 | A1 | 1/2013 | Sokol, Jr. et al. |
| 2013/0125130 | A1 | 5/2013 | Stubbs et al. |
| 2014/0173621 | A1 | 6/2014 | Stubbs et al. |

FOREIGN PATENT DOCUMENTS

| | | |
|---|---|---|
| JP | 11266254 A | 9/1999 |
| JP | 2006072991 A | 3/2006 |
| WO | 2007115319 | 10/2007 |

OTHER PUBLICATIONS

International Search Report and Written Opinion—PCT/US2011/062940—ISA/EPO—Mar. 12, 2012.

Li J., et al., "The Thrifty Barrier: Energy-Aware Synchronization in Shared-Memory Multiprocessors", Feb. 14, 2004, High Performance Computer Architecture, 2004. HPCA-10. Proceedings. 10th International Symposiums on Madrid, Spain Feb. 14-18, 2004, Piscataway, NJ, USA, IEEE, p. 14 - 14, XP010778825, ISBN: 978-0-7695-2053-7 the whole document.

Pantazis et al., "Power control schemes in wireless sensor networks for homecare e-health applications", Proceedings of the 1st international conference on PErvasive Technologies Related to Assistive Environments Jun. 19, 2008, XP002670363, Retrieved from the Internet: URL: http://dl.acm.org/citation.cfm"id=1389683 [retrieved on Feb. 24, 2012] the whole document.

Maurer W.D., et al., "Hash Table Methods", ACM Computing Surveys, ACM, New York, NY, US, US, vol. 7, No. 1, Mar. 1, 1975, pp. 5-19, XP009022942, ISSN: 0360-0300, DOI: 10.1145/356643. 356645 abstract line 1—p. 7, line 10.

* cited by examiner

| ACTIVE/SLEEP TRIGGER SETS | | | | ← 314 |
|---|---|---|---|---|
| | SLEEP | ACTIVE | TIMER | |
| 316 — INTERRUPT | SHUT DOWN | BRINGUP | <TIME> | |
| 318 — FROM SET | FROM ANY # | SLEEP | SLEEP | |
| 320 — GOTO SET | SLEEP | TO ANY # | TO ANY # | |
| | ↑ 322 | ↑ 324 | ↑ 326 | |

FIG. 4

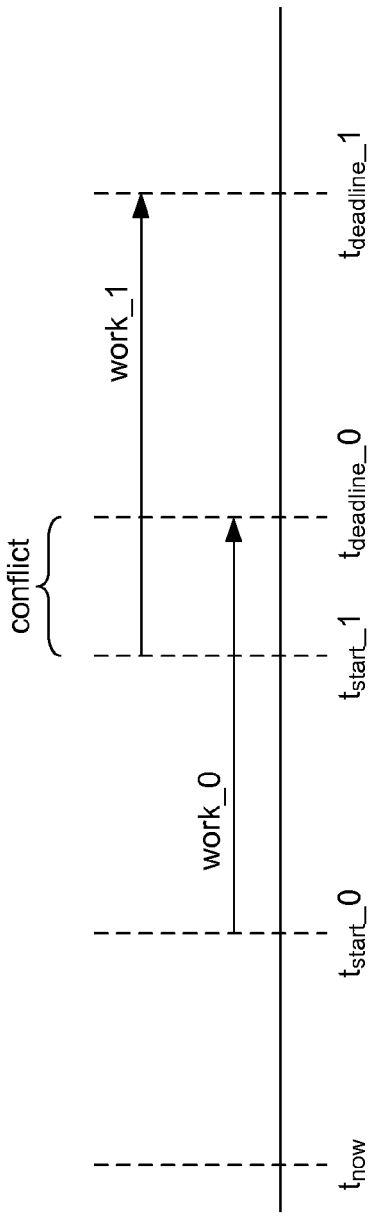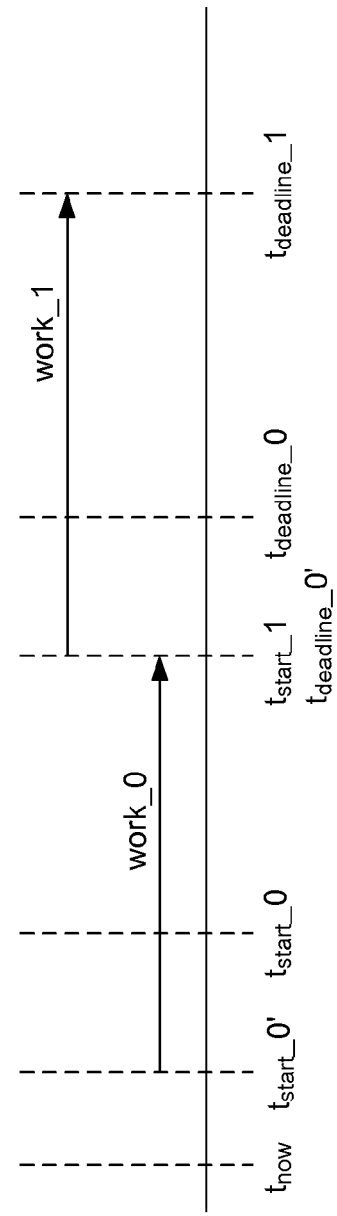

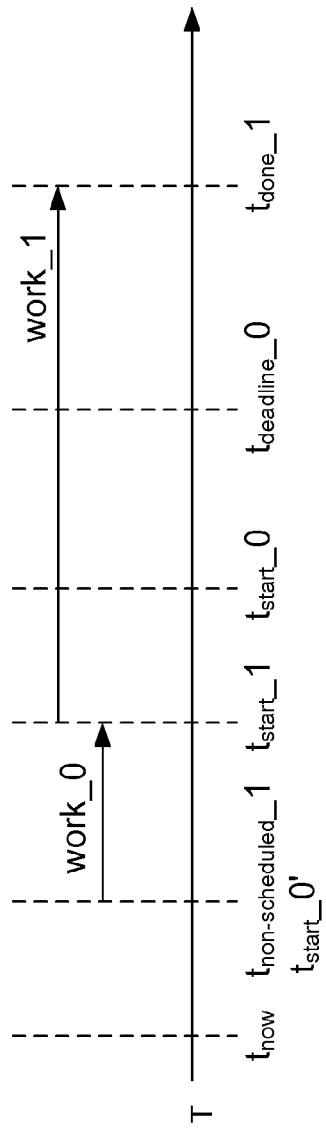
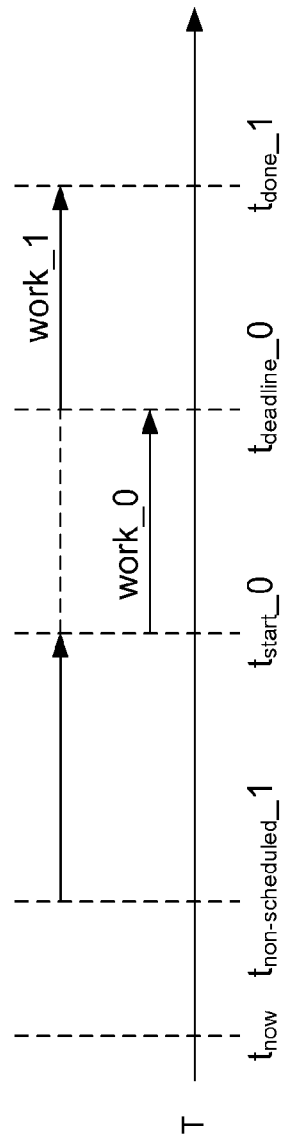
FIG. 17
FIG. 18

SYSTEM FOR MINIMIZING RESOURCE LATENCY BETWEEN PROCESSOR APPLICATION STATES IN A PORTABLE COMPUTING DEVICE BY SCHEDULING RESOURCE STATE SET TRANSITIONS

PRIORITY AND RELATED APPLICATIONS STATEMENT

The benefit of the filing date of U.S. Provisional Patent Application Ser. No. 61/425,677, filed on Dec. 21, 2010, entitled "METHOD AND SYSTEM FOR RAPID ENTRY INTO AND FOR RAPID EXITING FROM SLEEP STATES FOR PROCESSORS OF A PORTABLE COMPUTING DEVICE," and the benefit of the filing date of U.S. Provisional Patent Application Ser. No. 61/544,927, filed on Oct. 7, 2011, entitled "MINIMIZING RESOURCE LATENCY BETWEEN PROCESSOR APPLICATION STATES BY SCHEDULING RESOURCE SET TRANSITIONS," are hereby claimed, and the specifications thereof are incorporated herein in their entireties by this reference. This application is related to co-pending U.S. patent application Ser. No. 13/291,784, filed Nov. 8, 2011, entitled "MINIMIZING RESOURCE LATENCY BETWEEN PROCESSOR APPLICATION STATES IN A PORTABLE COMPUTING DEVICE BY USING A NEXT-ACTIVE STATE SET," and this application is related to co-pending U.S. patent application Ser. No. 13/069,071, filed Mar. 22, 2011, entitled "METHOD AND SYSTEM FOR RAPID ENTRY INTO AND FOR RAPID EXITING FROM SLEEP STATES FOR PROCESSORS OF A PORTABLE COMPUTING DEVICE," both of which are assigned to the assignee of the present application.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs typically have complex and compact electronic packaging that is generally made of multiple processing units that include central processing units, digital signal processors, and the like. Much of this hardware may be part of a system on a chip ("SOC") design as understood by one of ordinary skill in the art.

Conventional PCD's usually experience significant lag time when respective processors of different SOCs try to enter into low power states. Low power states, in which a processor or similar subsystem is not executing any application program or is otherwise effectively idle, are also referred to as sleep states, as understood by one of ordinary skill in the art.

One problem faced by conventional processors is that several communications usually take place in software in order for a processor to enter into a sleep state. This problem is further complicated by the fact that some resources are shared resources whose state needs to be coordinated between multiple SOC subsystems.

Within a given subsystem of SOC, the management of local resources is usually easy and may be done from the respective operating system's idle context. However, to manage the shutdown of a shared resources state usually has to be coordinated with the controller of that resource. Conventional solutions have worked around this shutdown complication through use of synchronous handshake in software before the subsystems are permitted to enter a sleep state. This approach is disadvantageous for several reasons: Software handshakes are slow. Software handshakes are prone to all sorts of delay, particularly interrupt service and context switch problems.

Software handshakes delay power savings. Because a handshake is in software, the instruction processing core needs to remain on until the full handshake is complete. Processor cores are large and complex, thus this is a considerable penalty in power savings to pay.

Accordingly, what is needed in the art is a method and system for allowing processors of PCDs to enter sleep states without software handshakes.

SUMMARY

A method and system for managing application states, such as sleep states and active states, of a portable computing device are described. Resource state sets corresponding to the application states are maintained in memory. A request may be issued for a processor operating in a first application state corresponding to the first resource state set to transition from the first application state to a second application state corresponding to the second resource state set. A start time to begin transitioning resources to states indicated in the second resource state set is scheduled based upon an estimated amount of processing time to complete transitioning the resources. At a scheduled start time, a process is begun by which the states of one or more resources are switched from states indicated by the first resource state set to states indicated by the second resource state set. Scheduling the process of transitioning resource states to begin at a time that allows the process to be completed just in time for the resource states to be immediately available to the processor upon entering the second application state helps minimize adverse effects of resource latency.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 4 illustrates an exemplary active-sleep trigger set for a processor;

FIG. 11 is a timeline indicating a conflict condition between processing associated with two requests;

FIG. 12 is a timeline indicating a result of an exemplary method for alleviating the conflict condition of FIG. 11;

FIG. 17 is a timeline indicating a resulting of a secondary exemplary method for alleviating the conflict condition of FIG. 15;

FIG. 18 is a timeline indicating a resulting of another exemplary method for alleviating the conflict condition of FIG. 16;

DETAILED DESCRIPTION

Figure 1:
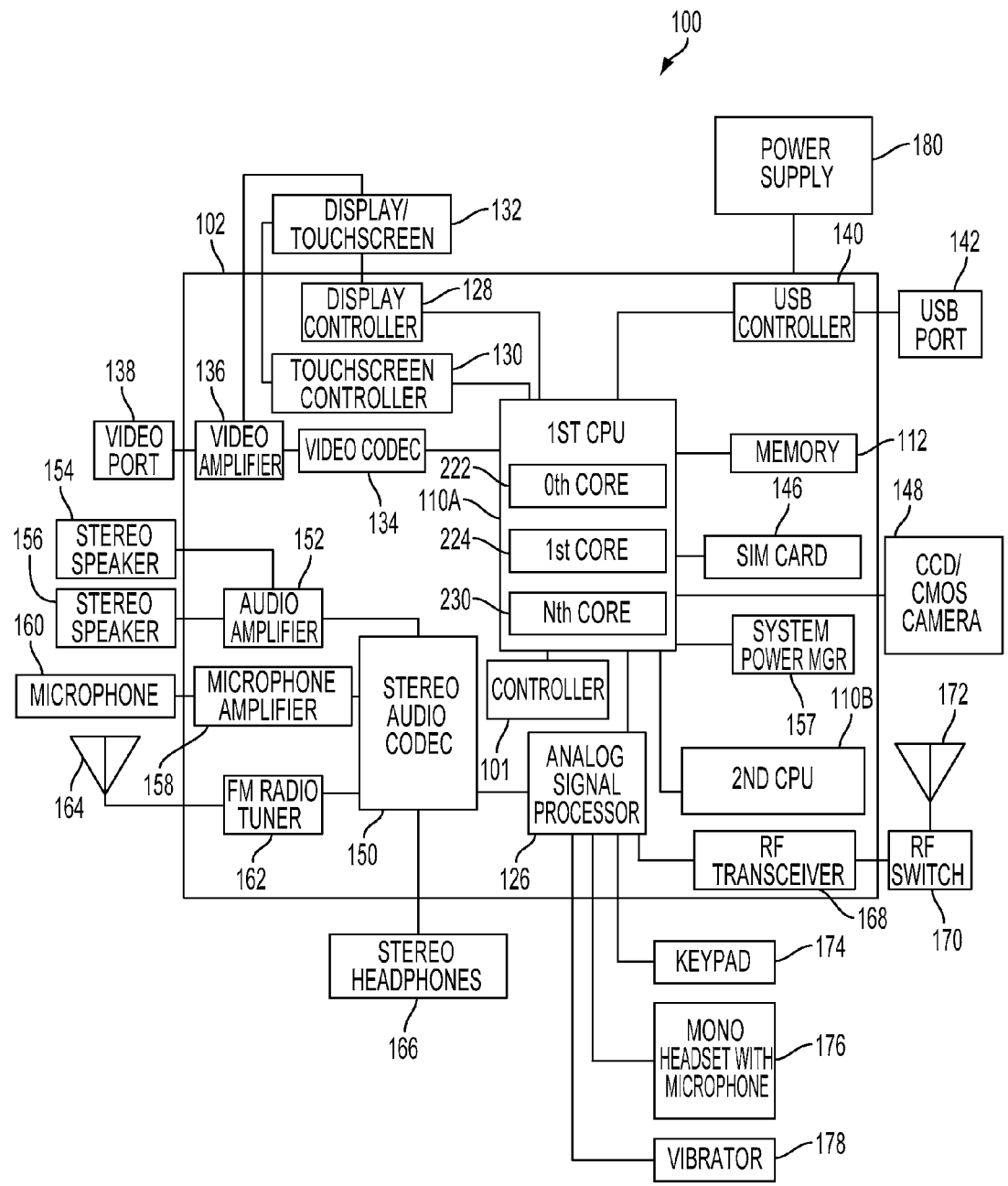
FIG. 1 is a functional block diagram illustrating an embodiment of a portable computing device (PCD)

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

FIG. 1: Elements of PCD 100 for Minimizing Resource Latency Between Processor Application States Referring to FIG. 1, this FIG. is a functional block diagram of an exemplary, non-limiting aspect of a PCD 100 in the form of a wireless telephone for implementing methods and systems for managing rapid sleep states of processors 110, 126 within the PCD 100. As shown, the PCD 100 includes an on-chip system 102 that includes a multi-core, first central processing unit ("CPU") 110A, a second CPU 110B that is a single-core type, and an analog signal processor 126.

These three processors 110A, 110B, and 126 may be coupled together. The first CPU 110A may comprise a zeroth core 222, a first core 224, and an Nth core 230 as understood by one of ordinary skill in the art. In an alternate embodiment, instead of using two CPUs 110, two digital signal processors ("DSPs") may also be employed as understood by one of ordinary skill in the art. In a further exemplary embodiment, any of the aforementioned may used in a combination as understood by one of ordinary skill in the art.

FIG. 1 includes one or more controller module(s) 101. For the remainder of this description, the controller module(s) 101 will be referred to in the singular, as a controller 101, and not plural. One of ordinary skill in the art will recognize that the controller 101 may be divided into various parts and executed by different processors 110, 126 without departing from the invention. Alternatively, the controller 101 may be organized as a single element and executed by a single processor 110 or 126.

FIG. 1 also illustrates system power manager 157. The system power manager ("SPM") 157 is coupled to the CPU 110A and the controller 101. The SPM 157 generally comprises hardware, such as a processor. However, software and/ or firmware may be employed for the SPM 157 as understood by one of ordinary skill in the art. The SPM 157 may be responsible for monitoring the state of a processor 110, 126 and a power rail. The SPM 157 may detect when a processor 110, 126 is about to enter a sleep state or is about to leave a sleep state. The SPM 157 may communicate these states of a processor 110, 126 to the controller 101. More generally, the SPM 157 may detect when a processor 110, 126 is about to transition from one application state to another. Application states of a processor 110, 126 may include not only a sleep state in which the processor 110, 126 is effectively idle or not executing any application programs and an awake or active state in which it is executing one or more application programs but also, or alternatively, any of the following: a state in which the processor 110, 126 is operating at a higher or lower speed than it operates in another state; a state defined by the processor 110, 126 executing an application program that is different from another state defined by the processor 110, 126 executing another application program; and a state defined by the processor 110, 126 concurrently executing a number of application programs that is different from another state defined by the processor 110, 126 concurrently executing a different number of application programs.

The controller 101 may comprise software which is executed by the CPUs 110. However, the controller 101 may also be formed from hardware and/or firmware as understood by one of ordinary skill in the art.

In general, the controller 101 may be responsible for promoting the rapid entry into sleep states and the rapid exiting from sleep states for the processors 110, 126. The controller 101 may include one or more tables that comprise resource sets and trigger sets as will be described in further detail below in connection with FIG. 3. The controller 101 may also have its own interrupt controller (not illustrated) for when all other hardware elements in the PCD 100 are placed in a low power state and are not functional.

The controller 101 also manages resource requests among one or more master processors 110, 126. Resource requests may be issued by a master processor 110 to request an action or function from a resource 105 (See FIG. 2).

Resources 105 are described more generally below but may include, for example, clocks and other low-level processors that support tasks, commands, and features of software applications that are executed by one or more master processors 110, 126. The controller 101 may be designed to prevent resource request conflicts among a plurality of master processors 110, 126.

FIG. 1 shows that the PCD 100 may include memory 112. The controller 101 running on the CPUs 110 may access the memory 112 to facilitate rapid sleep states and to facilitate rapid exiting from sleep states as will be described in further detail below.

In a particular aspect, one or more of the method steps described herein may implemented by executable instructions and parameters stored in the memory 112 that form the controller 101. These instructions that form the controller 101 may be executed by the CPUs 110, the analog signal processor 126, or another processor. Further, the processors, 110, 126, the memory 112, the instructions stored therein, or a combination thereof may serve as a means for performing one or more of the method steps described herein.

FIG. 1: Other Elements of the PCD 100

As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134. The video codec 134 is coupled to the multicore central processing unit ("CPU") 110. A video amplifier 136 is coupled to the video encoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102.

Some of the above-described elements of the PCD 100 may comprise hardware, while others may comprise software, and still others may comprise a combination of hardware and software. The term "resource" is used herein to refer to any such element, whether hardware, software or a combination thereof, that is controllable by a processor. A resource may be defined in one aspect as an encapsulation of the functionality of such an element. Except where it may otherwise be indicated, the term "processor" or "master processor" is used herein to refer to a processor such as the first CPU 110A, the second CPU 110B, the analog signal processor 126, or to any other processor, controller or similar element that operates under the control of software, firmware, or similar control logic. As described in further detail below, an example of a resource is a software element that executes on a processor. A thread of execution on a processor, such as, for example, a thread relating to an executing application program, may access a resource by causing a "request" to be issued on the resource.

In different application states, it may be necessary or desirable for a processor to request different configurations or states of resources. For example, a bus resource may control the speed of a bus clock. In one application state a processor may request a bus clock that allows the processor to operate at a rate of, for example, 100 million instructions per second (MIPS), while in another application state the processor may request a bus clock that allows it to operate at a rate of, for example, 150 MIPS. In the case of a processor preparing to enter an application state that is a sleep state, the processor may request a bus clock of zero MIPS. Similarly, in one application state defined by a processor executing a first application program the processor may request 100 MIPS, while in another application state defined by the processor executing a second application program the processor may request 150 MIPS. Likewise, in one application state defined by a processor concurrently executing a certain number of application programs the processor may request 100 MIPS, while in a second application state defined by the processor concurrently executing a different number of application programs the processor may request 150 MIPS. It should be understood that the above-referenced bus clock is intended only as an example of a resource that may be configured by a processor issuing a resource request, and also that the numbers "100" and "150" are intended as arbitrary examples of processing speeds.

Resource configurations or states may be grouped into resource state sets. A resource state set defines the configurations or states of one or more resources that are used together by a processor in a certain processor application state. For example, a certain resource state set may include configuration or state information for a bus clock resource to provide a processor with a certain number of MIPS of processing speed, and configuration or state information for a decoder (i.e., another example of a resource) to provide a decoding function to the processor.

Figure 2:
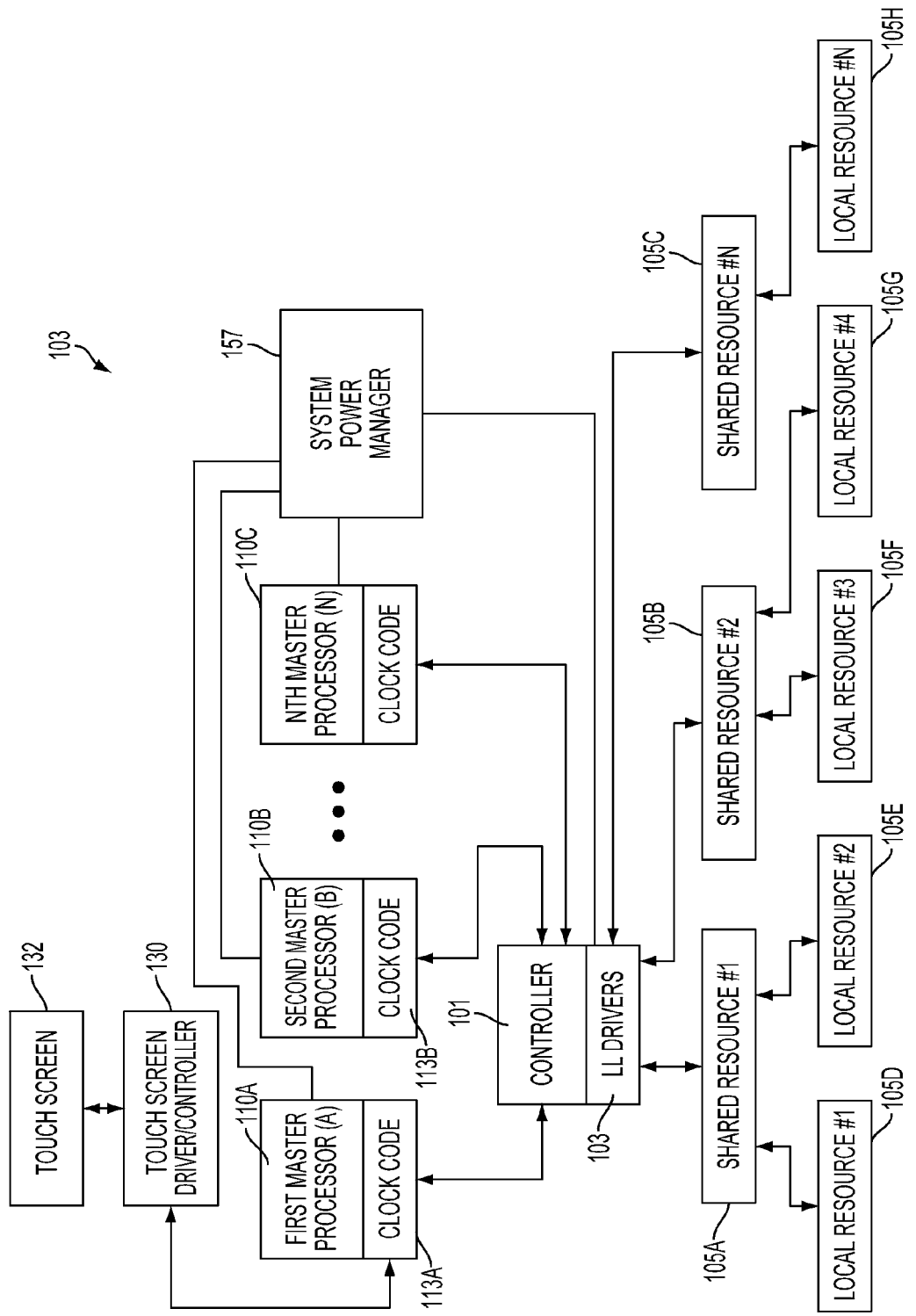
FIG. 2 is a functional block diagram illustrating relationships among a controller, a system power manager, master processors, low-level drivers, shared resources, and local resources.

FIG. 2 is a functional block diagram illustrating relationships among the controller 101, system power manager 157, master processors 110, 126, low-level drivers 103, shared resources 105A-C, and local resources 105D-H that form a system 103. FIG. 2 also illustrates how the touchscreen 132 may be coupled to the touchscreen driver/controller 130. The touchscreen driver/controller 130 may be coupled to clock code 113A of a first master processor 110A.

The system 103 may switch among resource state sets desired by a processor 110 in a manner that minimizes resource latency. The term "resource latency" refers to the delay or latency that occurs between a time at which a master processor 110, 126 begins preparing controller 101 and system power manager 157 to transition to another resource state set and the time that the resources of that set become configured to the specified states and ready for use by the processor. As described below, resource state sets may be broadly categorized into: active resource state sets, in which a processor is provided with resources configured to aid the processor in executing application programs and otherwise providing processing power; and a sleep resource state, in which a processor is provided only with resources that aid the processor in maintaining a sleep state, i.e., a state in which the processor is not executing application programs or otherwise providing processing power. Although a processor in a sleep state may maintain low-level functions, the processor does not execute software that would be understood by one of ordinary skill in the art to be an application program. It should be understood that the "next-active state" feature described below may be applied to transitions between any resource state sets, regardless of whether they may be active sets or sleep sets.

In the exemplary embodiment shown in FIG. 2, the first master processor 110A may be coupled to the system power manager 157 and the controller 101. The controller 101 may be coupled to the clock code 113A of the first master processor 110A. The controller 101 may comprise one or more low-level drivers 103. The one or more low-level drivers 103 may be responsible for communicating with one or more shared resources 105A-C. Shared resources 105A-C may comprise any type of device that supports tasks or functions of a master processor 110. Shared resources 105A-C may include devices such as clocks of other processors as well as single function elements like graphical processors, decoders, and the like.

The shared resources 105A-C may be coupled to one or more local resources 105D-H. The one or more local resources 105D-H may be similar to the shared resources 105A-C in that they may comprise any type of device that supports or aids tasks or functions of a master processor 110. Local resources 105D-H may include devices such as clocks of other processors as well as single function elements like graphical processors, decoders, and the like. The local resources 105D-H may comprise leaf nodes. Leaf nodes are understood by one of ordinary skill in the art as local resources 105D-H that usually do not refer or include other dependent resources 105.

The controller 101 may be responsible for managing requests that are issued from the one or more master processors 110, 126. For example, the controller 101 may manage a request that originates from the first master processor 110A. The first master processor 110A may issue this request in response to an operator manipulating the touchscreen 132. The touchscreen 132 may issue signals to the touchscreen driver/controller 130. The touchscreen driver/controller 130 may in turn issue signals to the clock code 113A of the first master processor 110A.

The controller 101 may also be responsible for managing the sleep states for a particular processor 110. Prior to entering a sleep state, a processor 110 will provide information for managing sleep states. Information for managing sleep states includes the entry into and exiting from a sleep state. This information for managing sleep states will be referred to below as triggers and resource states. A resource state set may include resource information for configuring one or more resources in a manner that supports a sleep state of a processor.

Triggers may define events that cause a processor 110 to either enter into a sleep state or to leave a sleep state. Triggers will generally reference resource states that are contained within or that are accessible by the controller 101. Resource states define a desired state of resources 105 needed by particular processor 110. In an exemplary embodiment, each processor 110 may provide at least two resource state sets to a controller 101: an active set of resource states and a sleep set of resource states. However, in other embodiments a processor may provide resource state sets in addition to a single active set and a single sleep set or resource state sets that are different from a single active set and a single sleep set. Such other resource state sets may correspond to one or more of the processor application states described above. That is, for any application state, the processor may provide a corresponding resource state set.

In the exemplary embodiment, the active set of resource states may define states of resources 105 for when the processor 110 is actively performing processing functions and requiring action/functions from its resources 105. The sleep set of resource states may define states of resources 105 when the processor 110 is in a sleep or idle state. Further details about triggers and resource states will be described below in connection with FIG. 3.

Figure 3:
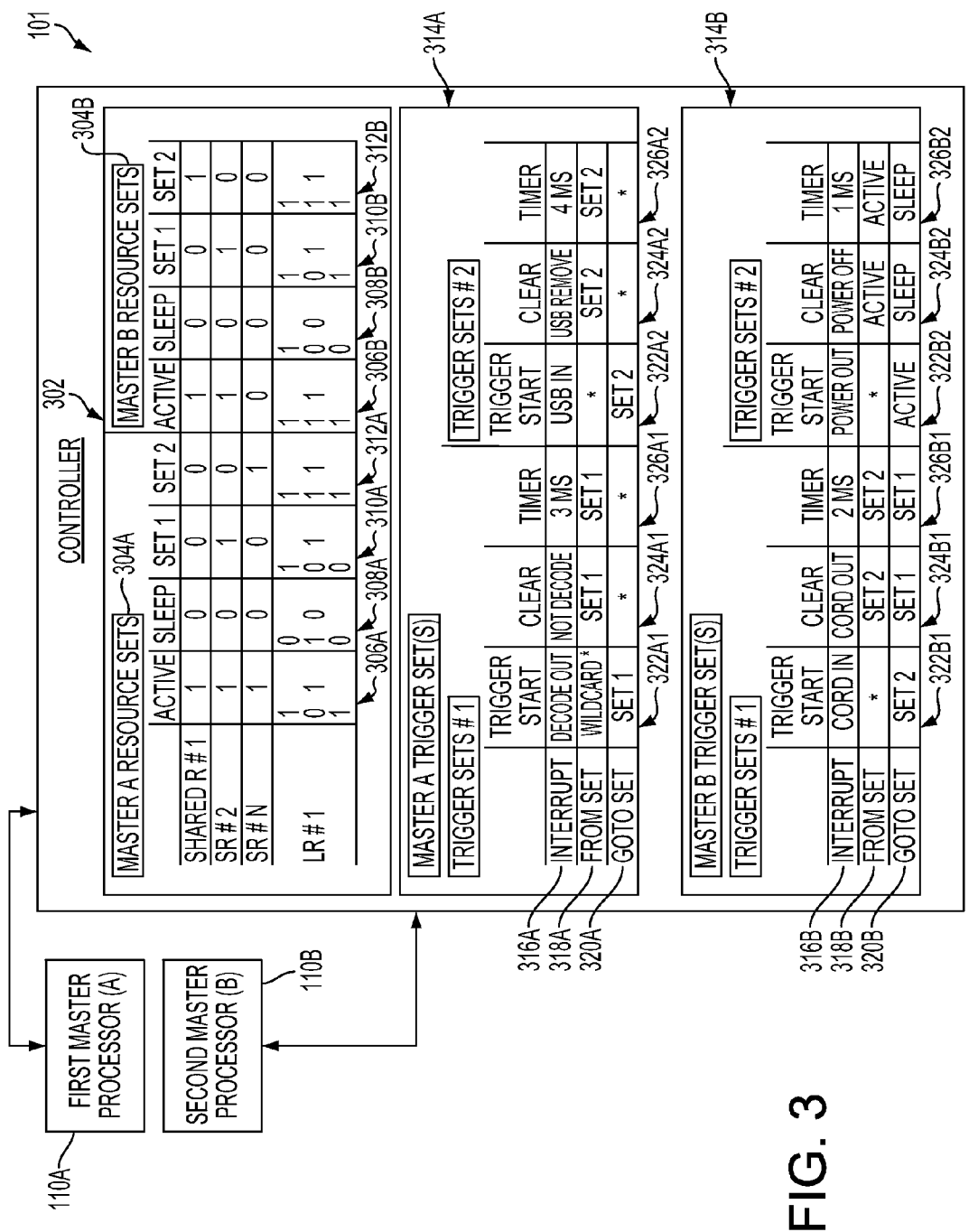
FIG. 3 is a functional block diagram illustrating details about the controller and trigger sets.

FIG. 3 is a functional block diagram illustrating details about the controller 101, resource sets 304, and trigger sets 314. As noted previously, the controller 101 may comprise software executed by one or more of the processors 110, 126 of the PCD 100. The controller 101 may store information in memory 112 or in an area within the controller 101, such as local storage as understood by one of ordinary skill in the art. This information may comprise a resource table 302 that includes resource sets 304 that are assigned to each master processor 110 which is serviced by the controller 101. This information may also comprise trigger sets 314 that are also assigned to each master processor 110 and which may be unique to each master processor 110.

Each resource set 304 generally comprises information relating to states of resources 105 desired by a particular master processor 110. Each resource set 304 assigned to a particular master processor 110 may comprise an active resource set 306, and a sleep resource set 308. The active resource set 306 may define or describe states of resources 105 when a particular master processor 110 is active or functioning normally. The sleep resource set 308 may define or describe states of resources 105 when a particular master processor is in a sleep or dormant state as understood by one of ordinary skill in the art. Each resource set 304 may also comprise additional sets such as "set 1" and "set 2" assigned to the first master processor 110 in the exemplary embodiment illustrated in FIG. 3.

As an example, the active resource set 306 for the first master processor (A) 110A as illustrated in FIG. 3 has assigned the following values for each of its resources 105: for the first shared resource (SR#1) 105A the value is one; the value for the second shared resource (SR#2) 105B is one; the value for the Nth shared resource (SR#N) 105C is one; while the four values for the first local resource (LR#1) 105D are one, zero, one, and one.

As noted previously, states of resources 105 are not limited to single values and may include a plurality of values. Further, states of resources may include any of a number of different types of parameters. For example, a state may designate hundreds of megahertz for the amount of clock speed of a particular clock that may function as a resource 105.

As another example, the sleep resource set 308A for the first master processor (A) 110A as illustrated in FIG. 3 has assigned the following values for each of its resources 105: for the first shared resource (SR#1) 105A, this resource has been assigned value of zero; the second shared resource (SR#2) 105B has an assigned value of zero; while the Nth shared resource (SR#N) 105C has an assigned value of zero. The first local resource (LR#1) 105D may have assigned values of zero, one, zero and zero.

Each trigger set 314 assigned to a particular master processor 110 may comprise at least three fields: an interrupt field 316; a "from set" 318; and a "go to set" 320. Each of these three fields of a trigger set 314 may also include a corresponding set of three columns: a trigger start column 322; a clear column 324; and a timer column 326.

The interrupt field 316 describes the action or activity that may be generated and/or detected by the system power manager 157. The interrupt field 316 may be generally characterized as the "trigger event" that may allow a controller 101 to select a specific resource set 304 which is desired by a particular processor 110 based on the trigger event detected by the SPM 157. The selection of a resource set 304 by the controller 101 may avoid the time consuming software handshake described above in the background section.

Reviewing the first trigger set (trigger set #1) of FIG. 3 for the first master processor (A) 110A, the fields of the set are discussed in order by columns. Starting with the first column of the trigger set 314A, the trigger start column 322 has an action listed as "decode interrupt" in its first row corresponding to the interrupt field 316.

As noted previously, the interrupt field 316 may define parameters that cause the controller 101 to activate the states of a resource set 304 in response to the detection of the trigger start field 322. In the exemplary embodiment illustrated in FIG. 3, the interrupt field 316A has been defined or described as a "decode interrupt" which means that when the system power manager 157 detects a "decode interrupt," such as when a PCD 100 is decoding video, then this event may alert the controller 101 to review the "from set" field 318 in the first column 322A1 under the "trigger start" column.

The "from set" field 318 may comprise a value that denotes what the current resource set 304 should be for the particular master processor 110 being reviewed by the controller 101. This field 318 may list a resource set 304 by its identifier such as the "active set," the "sleep set," or a set number like "set 1" or "set 2." The field 320 may also comprise a "wild card" like an asterisk.

A wildcard designation in the "from set" field 318 may cause the controller 101 to retrieve the last known active resource set 304 that was being used by a particular master processor 110. In the exemplary embodiment illustrated in FIG. 3, the "from set" row 318A and trigger start column 322A1 have a value of an asterisk or wildcard.

The "go to set" 320, like the "from set" 318, may comprise a listing of a resource set 304 by its identifier such as the "active set", the "sleep set", or a set number like "set 1" or "set 2". The field 320 may also comprise a "wild card" like an asterisk that means the last resource set 304 being utilized by a processor 110. In the exemplary embodiment illustrated in FIG. 3, the "go to set" field 320A and the trigger start field column 322A1 has a value of "set 1" which is the resource set 1 listed in column 310A of the first resource set 304A.

For the example illustrated in FIG. 3, when a decode interrupt event is detected by the SPM 157, it alerts the controller 101. The controller 101 reviews the first trigger set for the first master processor 110. Since the trigger start column 322A1 lists a matching value (a decode interrupt), the controller 101 reviews the "from set" field 318A and determines that the value is a wildcard value or asterisk. The controller 101 then reviews the "go to" field 320A which has a value of "set 1" that designates a particular resource set 304A. Based on this information reviewed by the controller 101, the controller 101 will switch the current resource set 304A for the first master processor 110A from its current set to the resource set "set 1." Resource Set 1 is listed in column 310A of the resource set 304A assigned to the first master processor 110A.

Further, when the SPM 157 or the controller 101 detects a "not decode" event such as illustrated in the clear column 324A1 of the first trigger set, then the controller 101 will then review the "from set" field 318A and determine that this value comprises "set 1." The controller 101 will then review the "go to set" field 320 which has a value of a wildcard or an asterisk in this example. This means that the controller 101 will switch the resource set 304A of the first master processor 110A from the "set 1" resource set to the last active resource set used by the processor 110A.

The timer field 326 of the trigger set may denote an amount of time that a particular resource set 304 may be used by the controller 101. So for the exemplary embodiment illustrating FIG. 3, for the timer field 326A1 of the first trigger set, this field has a value of three milliseconds. This means that when the decode interrupt event is matched with the trigger start field 322A1 of the first trigger set, then the controller 101 utilizes the resource set 304 specified in the "go to set" field 320A for only a period of three milliseconds. In other exemplary embodiments, situations may occur or exist in which there is no information in the timer field 326 or the value is defined to correspond with a value that indicates that there is no timer trigger 326 for this transition and that the transition only applies to the no decode field. In a situation in which the timer field is defined, such as illustrated in FIG. 3—timer fields 326A1 and 326A2, then whichever event occurs first between the timer field 326 and the Clear field 324 will usually initiate the transition.

FIG. 4 illustrates an exemplary active-sleep trigger set 314 for a processor 110. In this exemplary embodiment, the interrupt field 316 in the first column 322 define a "shut down" event as the action to initiate a sleep set 308 (FIG. 3) for a particular processor 110. The "shut down" event may include action like an operator selecting an on/off button for shutting down a PCD 100.

In the exemplary embodiment in FIG. 4, when a "shut down" event is detected, the controller 101 transitions the current active resource set 306 to a sleep set 308. The sleep set 308 is listed in a master resource set 304 of table 302 in FIG. 3.

When the controller 101 receives a message from the SPM 157 that a "bring up" event has occurred, such as a power-on event initiated by an operator of the PCD 100, then the controller would transition the processor 110 from its sleep set 308 to the last active resource set 304 based on the wildcard or asterisk value listed in the "go to set" field 320 of the trigger set 314.

As described above, the system 103 is not limited to active and sleep sets 306, 308. The system 103 may be used for switching between resource sets 304 for events other than entering or exiting sleep states as illustrated in FIG. 3.

Figure 5:
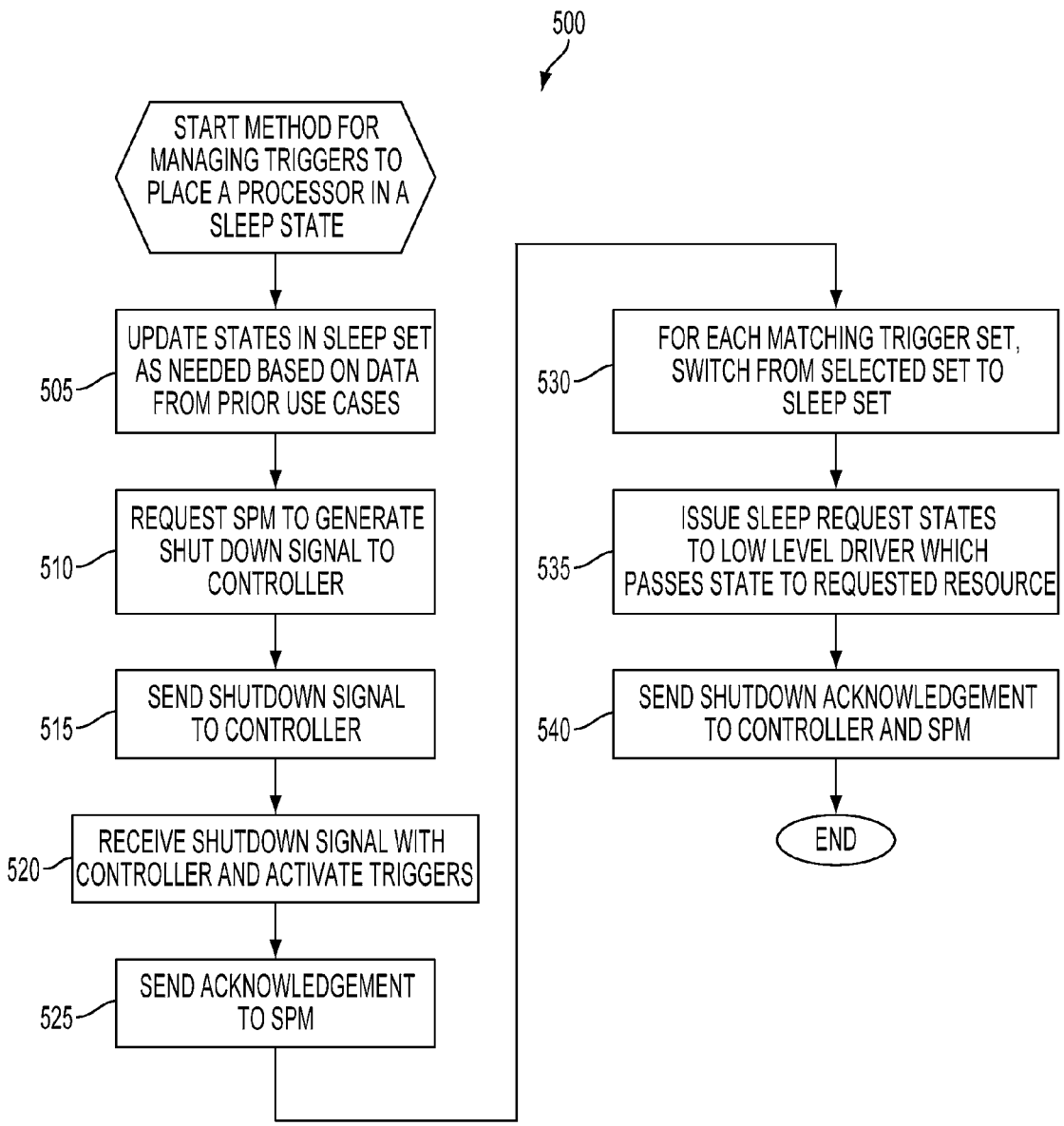
FIG. 5 is a logical flowchart illustrating a method for managing trigger sets and otherwise transitioning a processor from a first application state, such as an awake state to a second application state, such as a sleep state.

FIG. 5 is a logical flowchart illustrating a method 500 for managing trigger sets 314 to place a processor 110 into a sleep state. Block 505 is the first step of the method 500. In block 505, each processor 110 may update its resource sets 304 as well as its trigger sets 314 in the controller 101 (FIGS. 1-2) as needed based on data from prior use cases of the PCD 100.

In block 510, a processor 110 may request the SPM 157 (FIG. 2) to generate a shutdown signal to the controller 101. In block 515, the SPM 157 may send the shutdown signal to the controller 101.

The controller 101 may receive the shutdown signal in block 520 and activate the trigger sets 314 which may be assigned to a shutdown event as illustrated in FIG. 4. In the exemplary embodiment illustrated in FIG. 4, the shutdown signal is matched against the interrupt field 316 of the trigger set 314. The trigger set 314 directs the controller 101 to access a sleep set 308 as indicated in the "go to set" field 320. In block 525, the controller 101 may immediately send an acknowledgment signal to the SPM 157 while the controller 101 continues to activate resource sets 304 that are referenced by the trigger sets 314 which match the shutdown signal event.

In block 530, for each matching trigger set 314, such as the matching trigger set 314 listing the "shutdown" event in the corresponding interrupt field 316 illustrated in FIG. 4, the controller 101 may switch the current resource set 304 to a sleep set 308, such as the sleep set 308A of the first resource set 304A for the master processor 110A of FIG. 3.

Next, in block 535, the controller 101 may issue sleep request states to low-level drivers 103 such as illustrated in FIG. 2. The low-level drivers 103 may pass the requested states to the corresponding resources 105.

In block 540, each resource 105 may issue a shutdown signal acknowledgment to the controller 101 and the SPM 157. The method 500 may then end.

Figure 6:
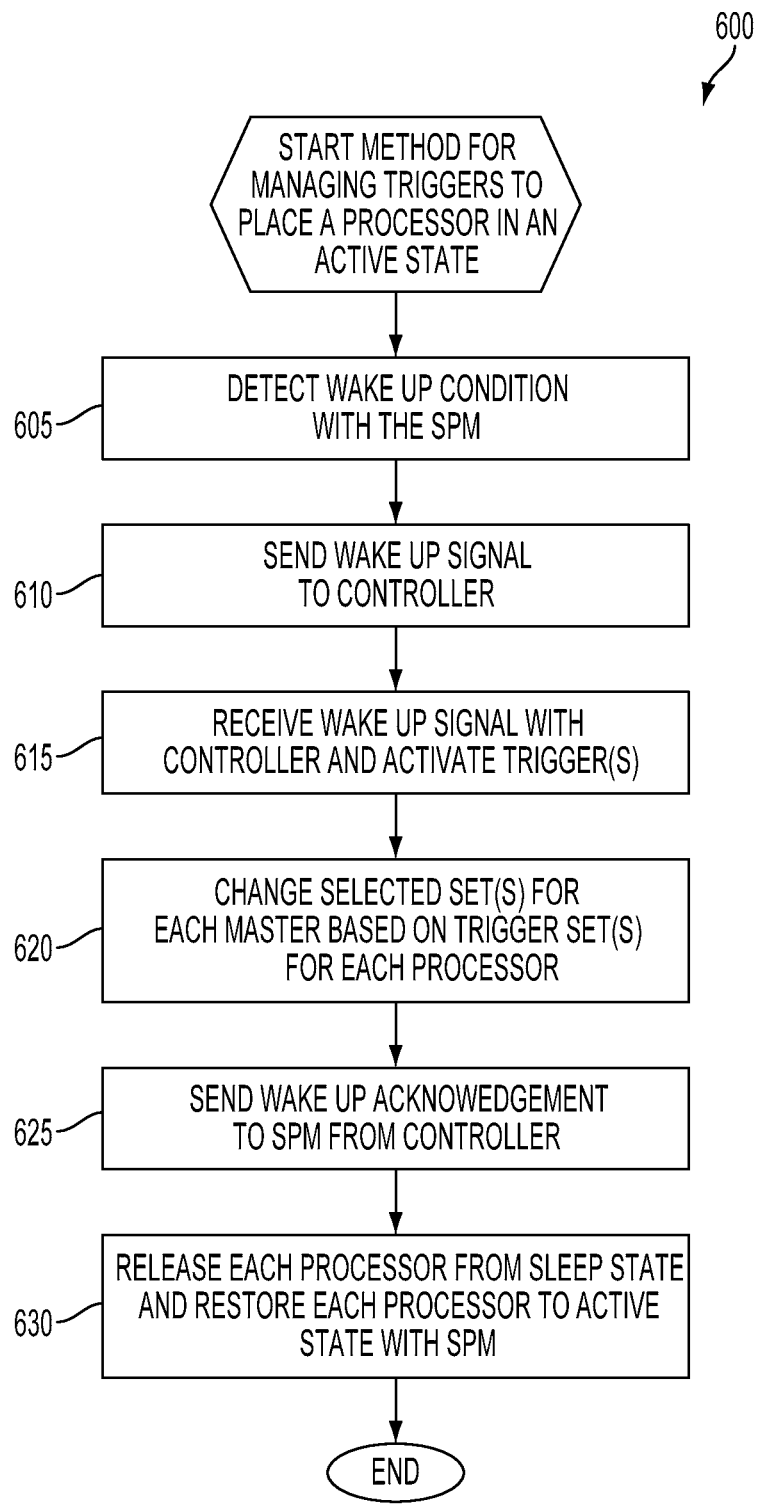
FIG. 6 is a logical flowchart illustrating a method for managing triggers sets and otherwise transitioning a processor from the second application state, such as a sleep state to a third application state, such as an awake state.

FIG. 6 is a logical flowchart illustrating a method 600 for managing trigger sets 314 to place a processor 110 in an active state from a sleep state. Block 605 is the first step in method 600. In block 605, a wake-up condition or wake-up event is detected with the SPM 157, or the wake-up event is detected directly by the controller 101, which may have its own interrupt controller (not illustrated). Exemplary embodiments may be designed such that wakeup interrupts may not be detectable by the SPM 157. In such exemplary embodiments, the controller 101 may use its interrupt controller to detect them and have these "mapped" to sleep set requirements for a master processor 110.

Next, in block 610 the SPM 157 may send a wake-up signal to the controller 101. In block 615, the controller 101 may receive the wake-up signal from the SPM 157 and activate one or more trigger sets 314 that matched the wake-up signal. For example, the controller 101 may match the wake-up signal with the "bring up" event listed in the interrupt field 316 in the "active" column of the trigger set 314 of FIG. 4. In the exemplary embodiment of FIG. 4, the go to set field' 320 in the active column 324 directs the controller to the last resource set 304 which was used by the current processor 110.

So in block 620, the controller 101 would change the current resource set 304 for a processor 110 based on this matching trigger set 314. One of ordinary skill in the art recognizes that the controller 101 will cycle through all of its trigger sets that it maintains as illustrated in FIG. 3.

Next, in block 625, the controller 101 may send a wake-up acknowledgment to the SPM 157 identifying which master processors 110 have been awakened from the sleep state. Next, in block 630, each processor 110 with a matching wake up trigger set 314 is released from a sleep state and restored to its active state with power supplied by the SPM 157. The method 600 then ends.

FIGS. 7-10 illustrate another feature, which is referred to in this description as "next-active resource state set" or "next-active set." One example of a next-active set is a next-awake set. The next-awake set or other next-active set may be used in the same manner described above with regard to FIG. 6 and the resource set 304 to which the controller 101 switches upon a wake-up event.

Figure 7:
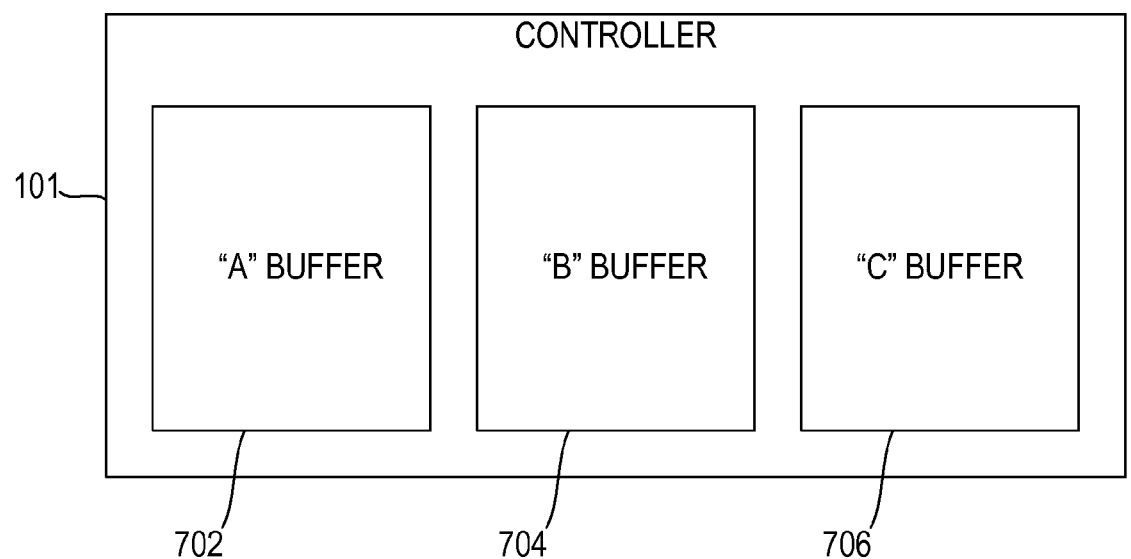
FIG. 7 is a functional block diagram of controller buffer memory.

FIG. 7 is similar to FIG. 3 in that it represents information stored in the controller 101. In an exemplary embodiment, the controller 101 may include three memory buffers, referred to in this description for convenience as the "A" memory buffer 702, the "B" memory buffer 704, and the "C" memory buffer 706.

Figure 8:
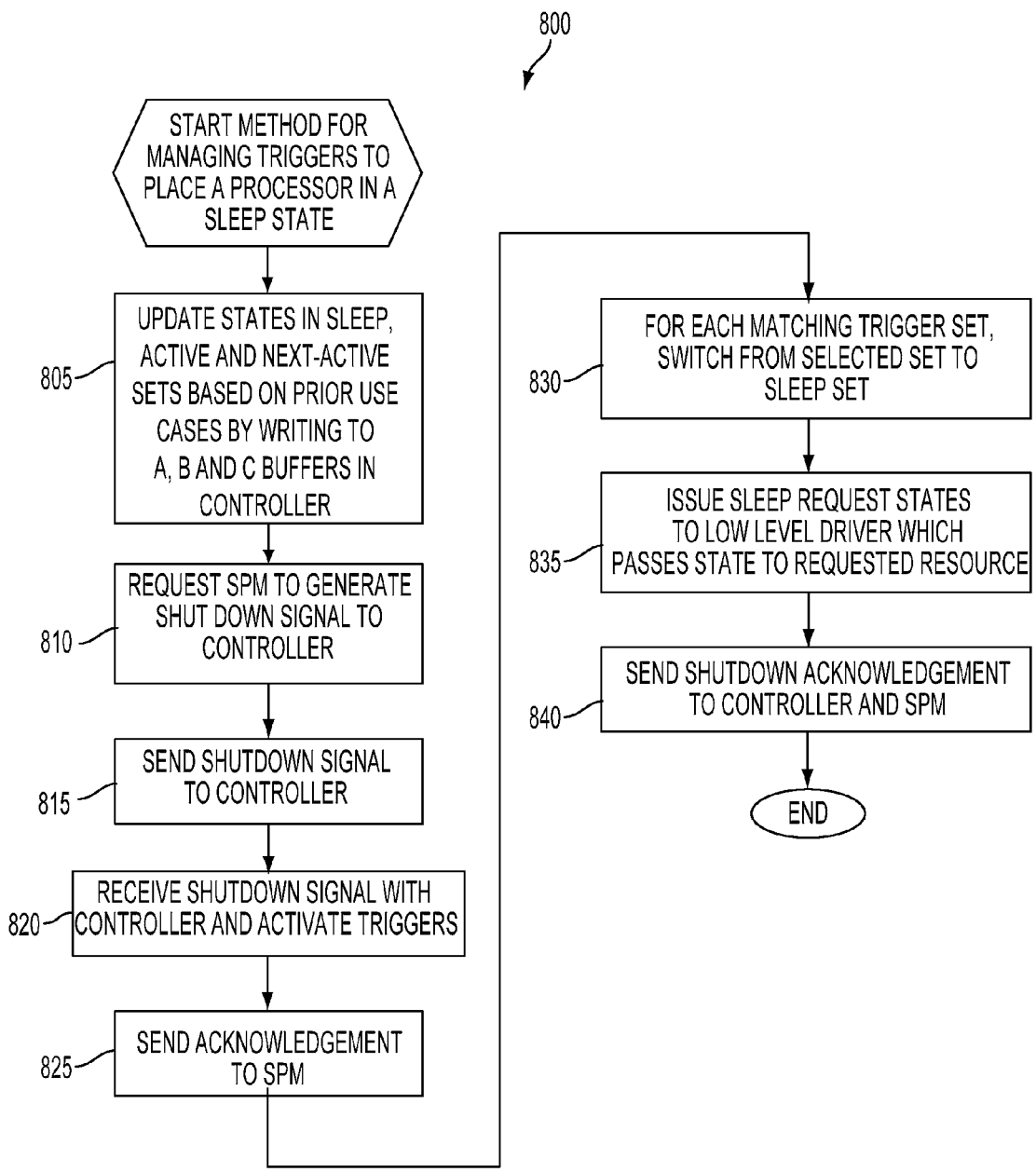
FIG. 8 is a logical flowchart illustrating an alternative method for transitioning a processor from a first application state, such as an awake state, to a second application state, such as a sleep state.

FIG. 8 is a logical flowchart similar to FIG. 5 in that it illustrates a method 800 for placing a processor into a sleep state. Block 805 is the first step of the method 800 and is similar to block 505 described above with regard to FIG. 5. Block 805 indicates that processor 110 may update not only an active or awake resource state set and a sleep resource state set but also a next-awake resource state set. As shown in FIG.

8, the processor may cause the active set to be stored in the "A" buffer 702 (FIG. 7) of the controller 101, the sleep set to be stored in the "B" buffer 704 (FIG. 7) of the controller 101, and the next-awake set to be stored in the "C" buffer 706 (FIG. 7) of the controller 101. Other aspects of block 805 are the same as described above with regard to block 505 (FIG. 5) and are therefore not described here.

Blocks 810, 815, 820, 825, 830, 835 and 840 are the same as blocks 510, 515, 520, 525, 530, 535 and 540, respectively, of FIG. 5 and are therefore not described here. Note that when the processor begins shutting down, it is in the awake application state corresponding to the awake set stored in the "A" buffer 702 (FIG. 7). The processor then enters the sleep application state corresponding to the sleep set that is stored in the "B" buffer 704 (FIG. 7) in the same way as described above with regard to FIG. 5. The processor awakes (FIG. 6) from the sleep application state in the next-awake application state corresponding to the next-awake set that is stored in the "C" buffer 706 (FIG. 7). By pre-storing the next-awake set updates in the "C" buffer 706 (FIG. 7) and applying them as soon as possible, the controller 101 may immediately begin configuring the resources specified by that next-awake set upon a wake-up event, thereby helping to minimize resource latency.

Figure 9:
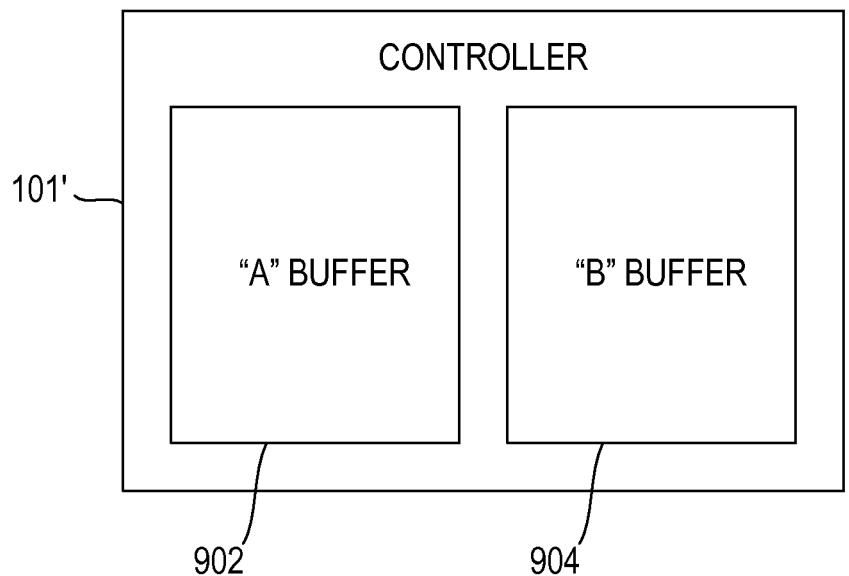
FIG. 9 is a functional block diagram of an alternative controller buffer memory.

FIG. 9 relates to another exemplary embodiment, in which the controller 101 does not have sufficient memory to simultaneously store all three of the above-described resource state sets. In this embodiment, the controller 101' has only an "A" buffer 902 and a "B" buffer 904, and there is no memory space available for a "C" buffer. In such an instance, the "A" buffer 902 is re-used so that at different times it stores the (then-current) awake set as well as the next-awake set.

Figure 10:
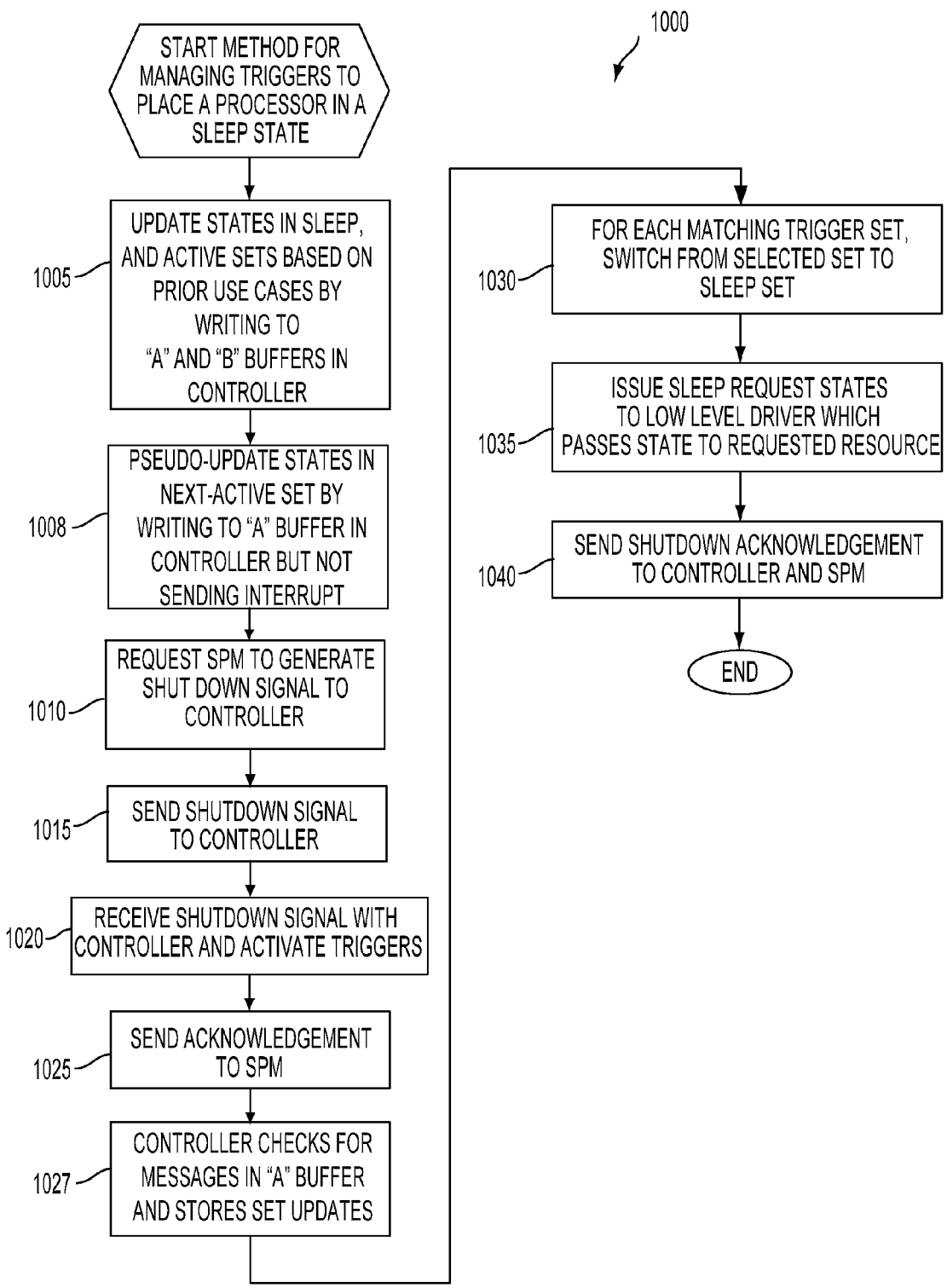
FIG. 10 is a logical flowchart illustrating another alternative method for transitioning a processor from a first application state, such as an awake state, to a second application state, such as a sleep state.

FIG. 10 is a logical flowchart similar to FIGS. 5 and 9 in that it illustrates a method 1000 for placing a processor into a sleep state. Block 1005 is the first step of the method 1000 and is similar to block 805 described above with regard to FIG. 8 but does not include storing the next-awake set in a "C" buffer. Rather, the processor may cause the active set to be stored in the "A" buffer 902 (FIG. 9) of the controller 101' and the sleep set to be stored in the "B" buffer 904 (FIG. 9) of the controller 101', but the processor waits until after it has reached a "point of no return" (as the term is understood by one of ordinary skill in the art) in transitioning to the sleep application states before re-using the "A" buffer to store the next-awake set. Other aspects of block 1005 are the same as described above with regard to block 505 (FIG. 5) and are therefore not described here.

In block 1008, the processor performs what may be referred to as a pseudo-update or virtual update of the next-awake set. Note that in the above-described block 1005 the processor may perform actual updates of resource state sets by writing the resource state sets to the "A" buffer 902 and "B" buffer 904 in the controller 101'. The updates are actual because the controller 101' receives an interrupt from the processor to notify it that the buffer contents have been updated, causing the controller 101' to act upon or apply the updates. The controller 101' applies the updates by performing various tasks that may be necessary to prepare the updated resource state set information for use. If the sleep set in buffer "B" is updated, the controller 101' may prepare the updated sleep set information for use in case a shutdown event or similar event that requires switching resource state sets subsequently occurs. If the active set in "A" buffer 902 is updated, the controller 101' may cause the resources to be adjusted accordingly. The pseudo-update that the processor performs in block 1008 includes storing updates for the next-awake set in "A" buffer 902 (FIG. 9) without sending an interrupt to the controller 101'. Because the controller 101' receives no interrupt, it does not yet apply the updates that occurred in "A" buffer 902 (FIG. 9). This pseudo-update occurs after a point of no return in which the processor 110 will request SPM 157 (FIG. 2) to signal a shutdown to the controller 101' and is assured not to make any further updates to the then-active resource set state information in the "A" buffer 902.

Blocks 1010, 1015, 1020 and 1025 are the same as described above with regard to blocks 510, 515, 520 and 525, respectively, of FIG. 5 and are therefore not described here.

Then, in block 1027 the controller 101' responds to the handshake that occurs between it and the processor (blocks 1020, 1025) by checking the "A" buffer 902 (FIG. 9) for updates and stores the updates to be used in the wake-up method of FIG. 6. (It may be noted that the memory buffers are also referred to as "message RAM" due to the way an interrupt is used to notify the recipient controller 101' of "messages" that the processor has written to the buffers.) Thus, by pre-storing the next-awake set in the "A" buffer 902 (FIG. 9), the controller 101' is able to immediately begin configuring the resources specified by that next-awake set upon a wake-up event, thereby helping to minimize resource latency.

Blocks 1030, 1035 and 1040 are the same as blocks 530, 535 and 540, respectively, of FIG. 5 and are therefore not described here. The processor then accordingly enters the sleep application state corresponding to the sleep set that is stored in the "B" buffer 904 (FIG. 9) in the same way as described above with regard to FIG. 5. The processor awakes (FIG. 6) from the sleep application state in the next-awake application state corresponding to the next-awake set that is stored in the "B" buffer 904 (FIG. 9). By pre-storing the next-awake set and applying it as soon as possible, the controller 101' is able to immediately begin configuring the resources specified by that next-awake set upon a wake-up event, thereby helping to minimize resource latency.

FIGS. 11-23 illustrate another feature, which relates to scheduling the above-described resource set transitions. One of ordinary skill in the art understands that in many instances the above-described changes in processor application program state may occur with a relatively predictable periodicity. For example, in PCD 100 (FIG. 1) it may be necessary for a processor executing a video player application program to wake up in or otherwise transition to a state in which the processor may decode a frame of video data on a periodic basis (e.g., every X milliseconds). Similarly, it may be necessary for a processor controlling a cellular telephone function of PCD 100 to, for example, wake up in or otherwise transition to a state in which the processor may check for an RF communications signal on a periodic basis (e.g., every X milliseconds). Since the times at which a periodic change in application program state is to occur may be predicted, and since the amount of time necessary for the resources to complete transitioning to the states corresponding to the next application program state are substantially fixed or constant, the time at which it is necessary to begin the process of switching resource state sets may be predicted. For example, it may be predicted that a processor needs to have a set of resources in states indicated by an exemplary resource state set ("R") at time $t_{deadline}$. This exemplary resource state set "R" may specify that a bus clock resource is to change to, for example, 100 MHz and a power supply resource is to change to, for example, 3 V. The amount of time ("work_time") that it will take for the controller 101 to ensure that the bus clock resource and power supply resource have completed these transitions may be determined. (The term "work" refers to the processing, configuring and hardware control that the controller 101 must perform in order to effect the resource state transitions.) Accordingly, in order for the resources to be in the states indicated by resource state set "R" by the time $t_{deadline}$, in this example the controller 101 needs to start the process of transitioning the bus clock and power supply resources (e.g., steps 530 and 535 in FIG. 5, steps 830 and 835 in FIG. 8, etc.) by an amount of time before $t_{deadline}$ at least equal to work_time.

In PCD 100, two or more processors (e.g., master processors 110A, 110B, 110C, etc., in FIG. 2) may request resource state set transitions at times that are very close to each other, such that the controller 101 would need to work on transitioning the resources for one processor while simultaneously working on transitioning the resources for another processor. Similarly, another element such as the SPM 157 may request a resource state set transition while the controller 101 is working on transitioning resources or scheduled to work on transitioning resources. Such "conflict" conditions are undesirable because, in the exemplary embodiment, the controller 101 is not able to perform these tasks simultaneously.

FIG. 11 is a timeline that illustrates an example of the above-described conflict condition. The approximate time at which the controller 101 begins the scheduling method described below and detects the conflict condition is labeled "$t_{now}$." In the example shown in FIG. 11, the controller 101 determines that in order for the resources to be in the states required by a first processor at time $t_{deadline\_0}$, the controller 101 needs to start the process or work ("work_0") of transitioning these resources into the required states at time $t_{start\_0}$. Similarly, the controller 101 determines that in order for the resources to be in the states required by a second processor at time $t_{deadline\_1}$, the controller 101 needs to start the process or work ("work_1") of transitioning these resources into the required states at time $t_{start\_1}$. It may be noted that the overlap between work_0 and work_1 represents a conflict condition.

FIG. 12 illustrates in timeline form a method for alleviating the conflict condition shown in FIG. 11. To alleviate the conflict, the controller may schedule work_0 to be completed before beginning work_1. The controller 101 thus computes a modified time $t_{start\_0}'$ at which it is to start transitioning these resources into the required states in order to complete work_0 before $t_{start\_1}$ (i.e., a modified deadline time $t_{deadline\_0}'$):

$$t_{start\_0}' = t_{deadline\_0} - (t_{deadline\_1} - \text{work}\_1).$$

It may be noted that $t_{start\_0}'$ in the above calculation is relative to $t_{now}$.

Figure 13:
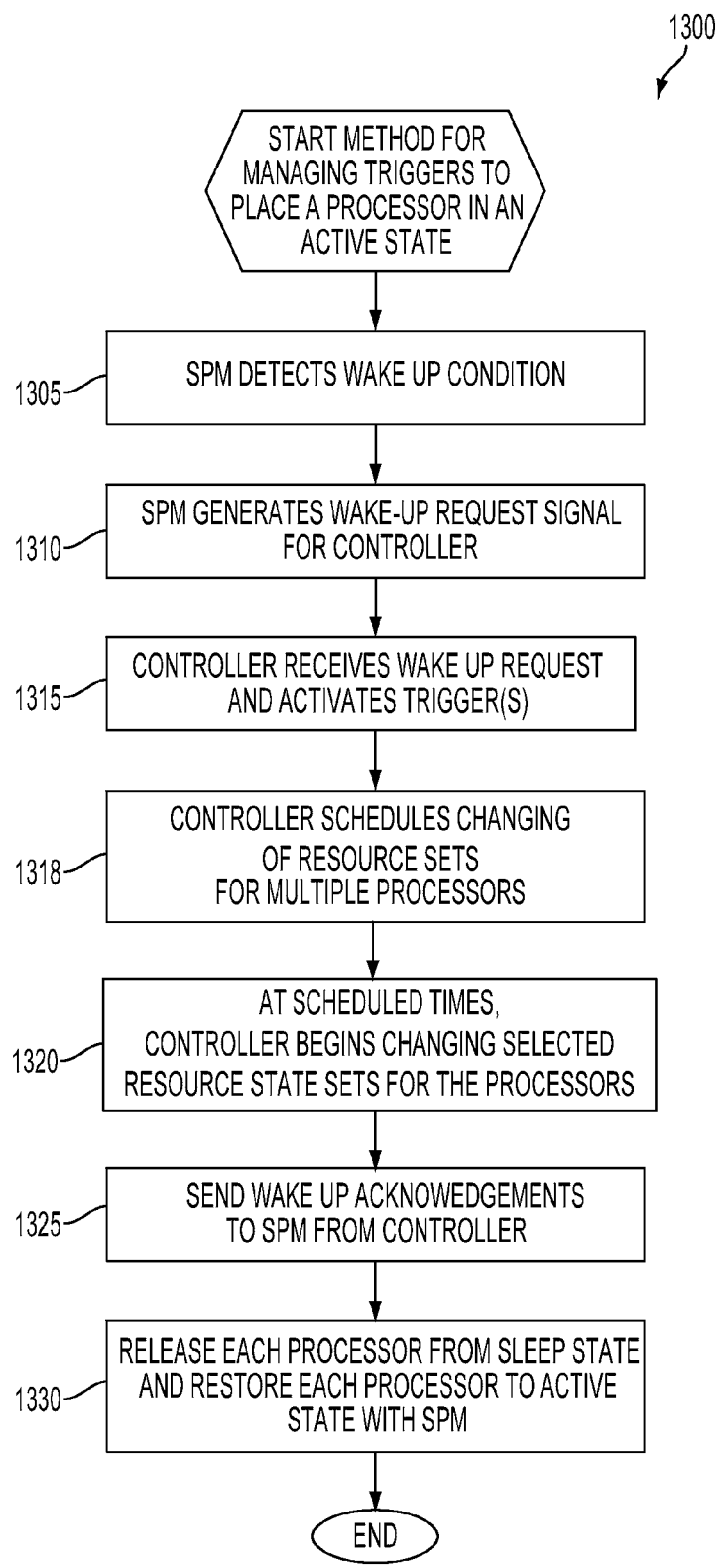
FIG. 13 is a logical flowchart similar to FIG. 6 illustrating a method for transitioning a processor from a sleep application state to an awake application state, including scheduling the processes of changing resource states.

FIG. 13 is a logical flowchart illustrating a method 1300 for transitioning a processor 110 from a sleep application state corresponding to a sleep resource state set to an active application state corresponding to an active resource state set. Method 1300 is similar to the above-described method 600 of FIG. 6 except that method 1300 includes scheduling the processing or work that the controller 101 performs to change or transition the resource states. As blocks 1305, 1310 and 1315 are the same as blocks 605, 610 and 615, respectively, of FIG. 6 they are not described here. In block 1318, the controller 101 schedules the resource state set transitions for one or more processors that the controller 101 determines are to change application states on a periodic basis. As described above, a predicted change in application state has an associated deadline by which the resources of a resource set corresponding to the next application state are to be fully transitioned. This scheduling step may include computing the amount of time ("work") that a resource state set transition will take to complete and thus the time at which it is necessary for the controller 101 to start the transition process or "work" in order to complete the transition by the deadline. This scheduling step may also include alleviating any scheduling conflicts in the manner described above or using alternative methods. As blocks 1320, 1325 and 1330 are the same as block 620, 625 and 630, respectively, they are not described here.

Figure 14:
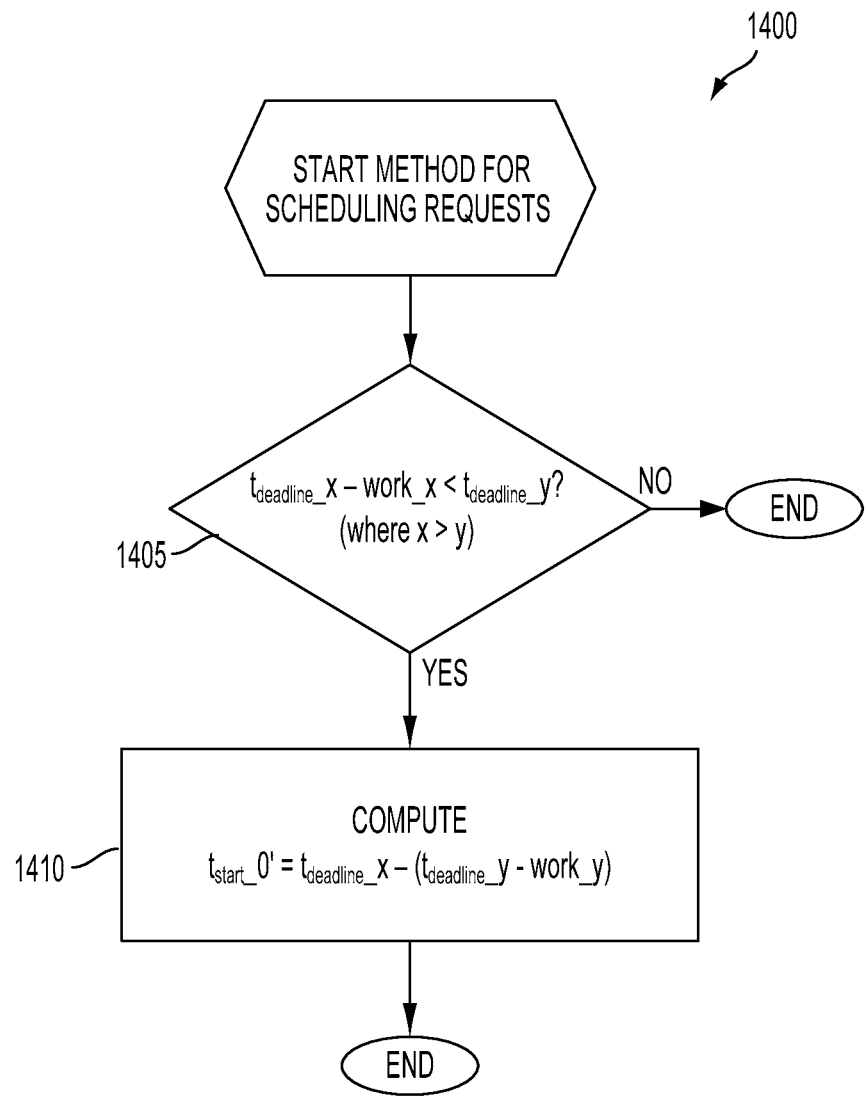
FIG. 14 is a logical flowchart illustrating a method for alleviating a conflict condition in scheduling the processes of changing resource states.

FIG. 14 is a logical flowchart illustrating a method 1400 that may be included in block 1318 of FIG. 13 to schedule resource state set transitions. Block 1405 indicates that the controller 101 may evaluate the following expression:

$$t_{deadline\_x} - \text{work}\_x < t_{deadline\_y},$$

where x and y are indices representing two requests for resource state transitions (e.g., from a first processor X and a second processor y), and where x>y. If the expression evaluates to false, then there is no conflict condition between the two requests, and the method ends. If the expression evaluates to true, then there is a conflict condition of the type described above with regard to FIG. 11. If it is determined that a conflict condition exists, then the controller 101 may compute a modified start time to alleviate the conflict:

$$t_{start\_x}' = t_{deadline\_x} - (t_{deadline\_y} - \text{work}\_y).$$

The controller 101 may substitute the modified start time for the originally scheduled resource state set transition start time.

Methods for alleviating scheduling conflicts may also take into account non-scheduled resource state set transition requests. As described above, scheduled resource state set transition requests include those that occur on a periodic basis or are otherwise predictable. Non-scheduled resource state set transition requests may occur as a result of unpredictable events, such as a user performing an action using touchscreen 132 (FIG. 2) that causes PCD 100 to wake up one or more processors. A non-scheduled request has no associated deadline time ("$t_{deadline}$") by which a resource state set transition must be complete. Rather, it is only relevant to refer to a time ("$t_{done}$") at which the resource state set transition will be complete if started at a particular time.

Figure 15:
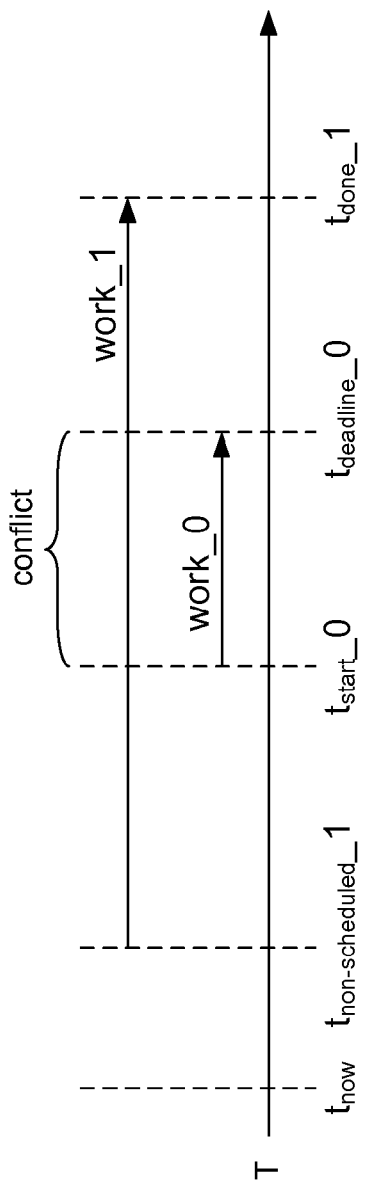
FIG. 15 is a timeline indicating a conflict condition between processing associated with a scheduled request and a non-scheduled request.

FIG. 15 is a timeline illustrating that a conflict condition may occur if the controller 101 begins processing, i.e., working on, a non-scheduled resource state set transition request as soon as the request occurs at $t_{non\text{-}scheduled\_1}$ and continues working on the request until the resource state set transition is completed at $t_{done\_1}$. Note that the processing ("work_0") of the scheduled request that begins at $t_{start\_0}$ and ends at $t_{deadline\_0}$ overlaps the processing ("work_1") of the non-scheduled request.

Figure 16:
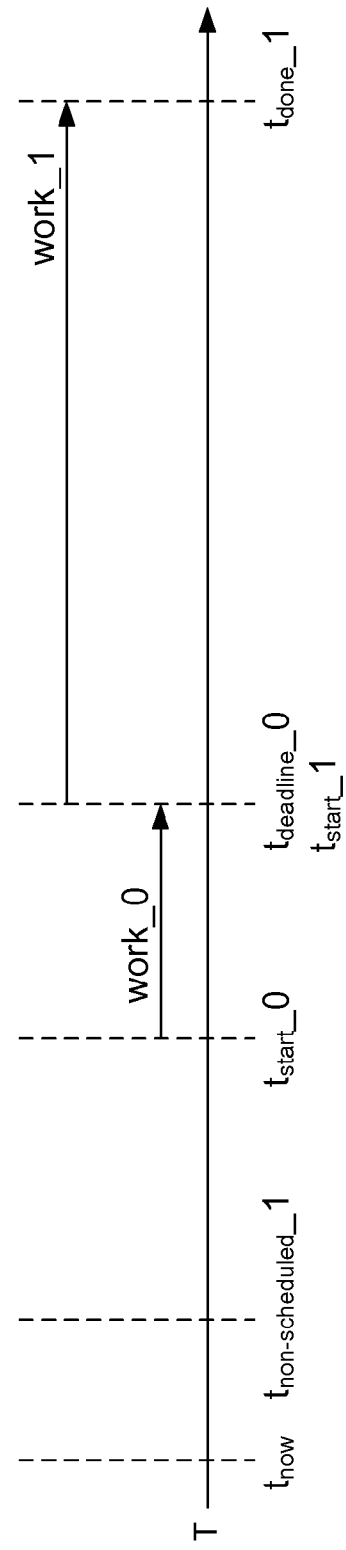
FIG. 16 is a timeline indicating a resulting of an exemplary method for alleviating the conflict condition of FIG. 15.

FIG. 16 is a timeline illustrating a straightforward exemplary method for alleviating the conflict condition of FIG. 15. To alleviate the conflict condition, the controller 101 may first transition the resources associated with the scheduled request and then transition the resources associated with the non-scheduled request.

FIG. 17 is a timeline illustrating a second straightforward exemplary method for alleviating the conflict condition of FIG. 15. To alleviate the conflict condition, the controller 101 may first transition the resources associated with the scheduled request, and then transition the resources associated with the non-scheduled request. However unlike the method shown in FIG. 16, the start of work_0, $t_{start\_0}$, is moved earlier, to $t_{start\_0}'$, to allow work_1 to complete sooner to avoid delay to the non-scheduled work.

FIG. 18 is a timeline illustrating another exemplary method for alleviating the conflict condition of FIG. 15. To alleviate the conflict condition, the controller 101 may first compute a modified start time:

$$t_{start\_1} = (t_{deadline\_0} - \text{work}\_0) - t_{now}.$$

The controller 101 may begin a subset or portion of the work of transitioning the resources associated with the non-scheduled request at the modified start time $t_{start\_}1$. Then, at $t_{start\_}0$, the controller 101 stops working on transitioning the resources associated with the non-scheduled request and instead switches to transitioning the resources associated with the scheduled request. After the controller 101 completes transitioning the resources associated with the scheduled request at $t_{deadline\_}0$, the controller 101 may return to the work of transitioning resources associated with the non-scheduled request.

Figure 19:
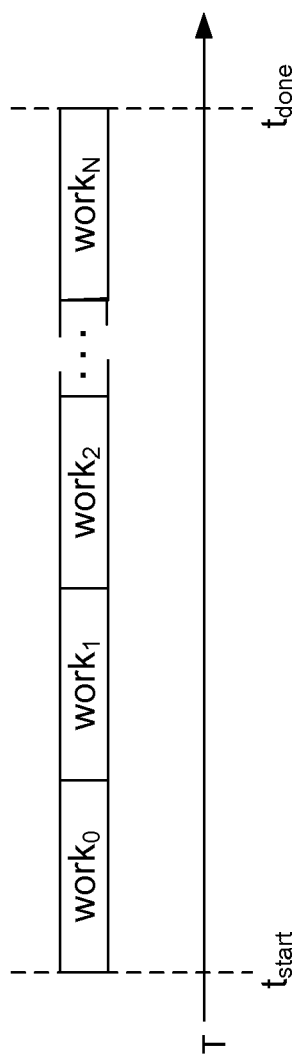
FIG. 19 is a timeline illustrating portions of the processing or work associated with transitioning to a resource state set.

FIG. 19 illustrates that the work or processing involved in transitioning resources associated with a resource state set change request may, in many instances, be divided into subsets or portions, "$work_0$" through "$work_N$." The work or processing involved in transitioning resources associated with a resource state set change may involve many discrete tasks. Thus, the controller 101 readily may be able to temporarily suspend the process of transitioning to another resource state set between such discrete tasks. For example, the portion of the processing or work that occurs between $t_{start\_}1$ and $t_{start\_}0$ in FIG. 18 may comprise one or more such discrete tasks.

Figure 20:
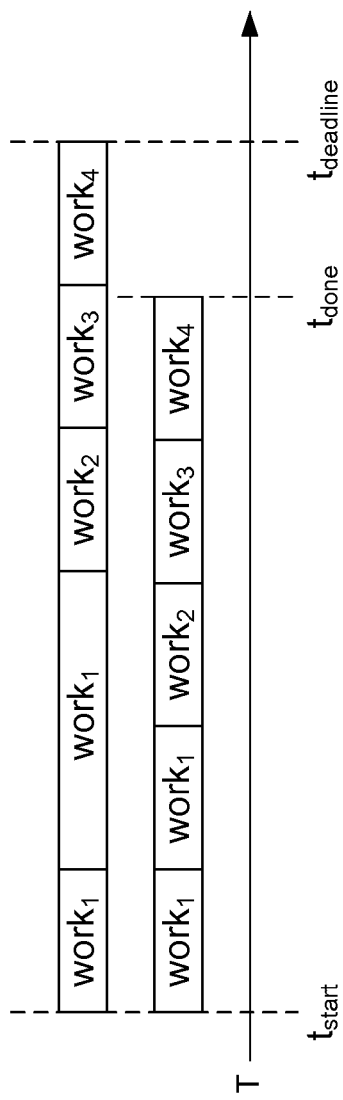
FIG. 20 is a timeline indicating a wasted power condition when actual work is complete quicker than expected.

FIG. 20 is a timeline illustrating that a subset or portion of work can complete earlier than expected, resulting in finishing the work, $t_{done}$, earlier than the deadline, $t_{deadline}$. This could result in wasted power as the result of the resource(s) involved in the work consuming power earlier than is required to meet the deadline (as understood by one of ordinary skill in the art).

Figure 21:
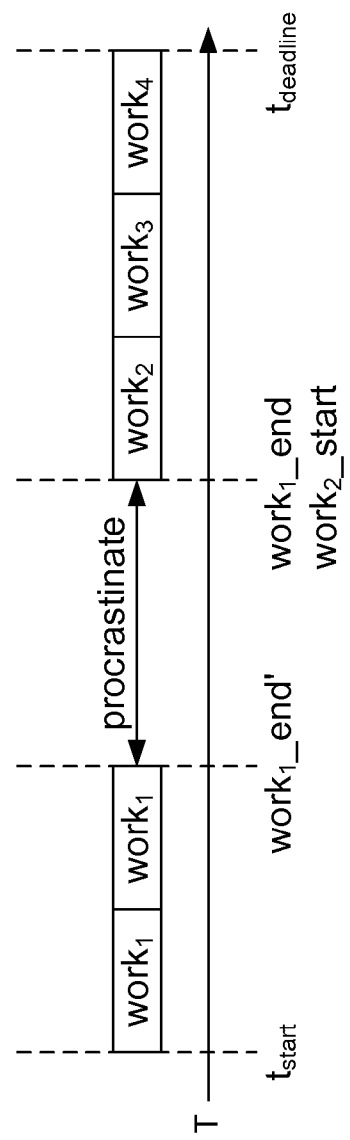
FIG. 21 is a timeline indicating a resulting of an exemplary method for alleviating the wasted power condition of FIG. 20.

FIG. 21 illustrates an exemplary method for alleviating the wasted power condition of FIG. 20. To alleviate the condition, the subsequent subset or portion of work after the subset or portion of work that completed early can be delayed or "procrastinated." The "$work_{N+1}$" can be delayed until the expected completion of "$work_N$" in order to avoid the power impact as the result of changing the resource(s) in work after "$work_N$".

Figure 22:
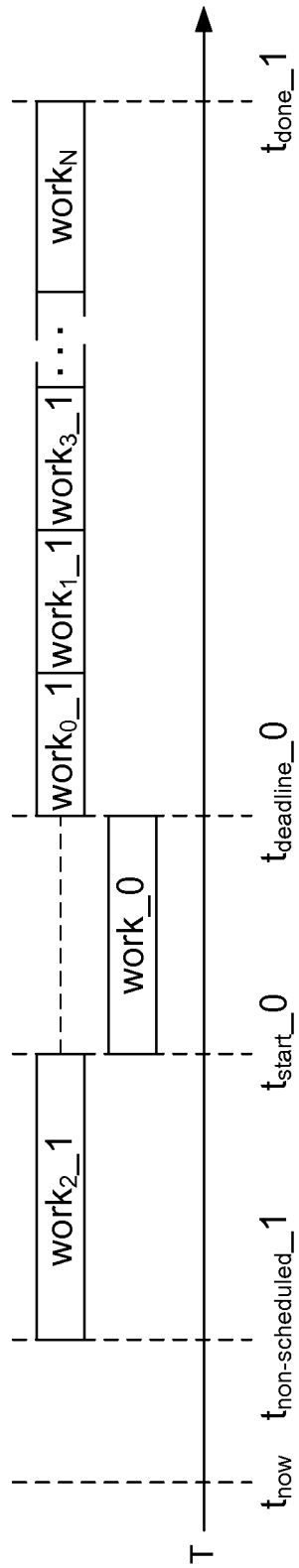
FIG. 22 is a timeline similar to FIG. 17, showing portions of the work.

FIG. 22 illustrates the discrete task concept more fully and shows that, for example, a portion $work_2\_1$ may be performed between $t_{start\_}1$ and $t_{start\_}0$. It should be noted that, since some of the discrete tasks involved in transitioning the resources of a resource state set do not depend on others, such tasks may be performed in any suitable order. Thus, for example, even though the work may be shown in FIG. 19 as involving sequential tasks, there may be no adverse consequences in some instances of performing tasks out sequence, such as performing $work_2\_1$ before $work_0\_1$. It should also be noted that the discrete tasks or portions may not be of equal length as each other. Therefore, if one of the discrete tasks or portions, such as $work_2\_1$, fits the time interval between $t_{start\_}1$ and $t_{start\_}0$ in the example shown in FIG. 22 better than other portions of that resource state set transition, then the controller 101 may optimize the method by performing the portions in such an order. In general, it may be desirable to perform the most work possible on the resource state set transition as soon as possible. Therefore, it may be more desirable to perform a longer portion that just fits the time interval between $t_{start\_}1$ and $t_{start\_}0$ in the example shown in FIG. 22 than to perform a shorter portion in that interval and thus leave a gap with no work performed just before $t_{start\_}0$.

Figure 23:
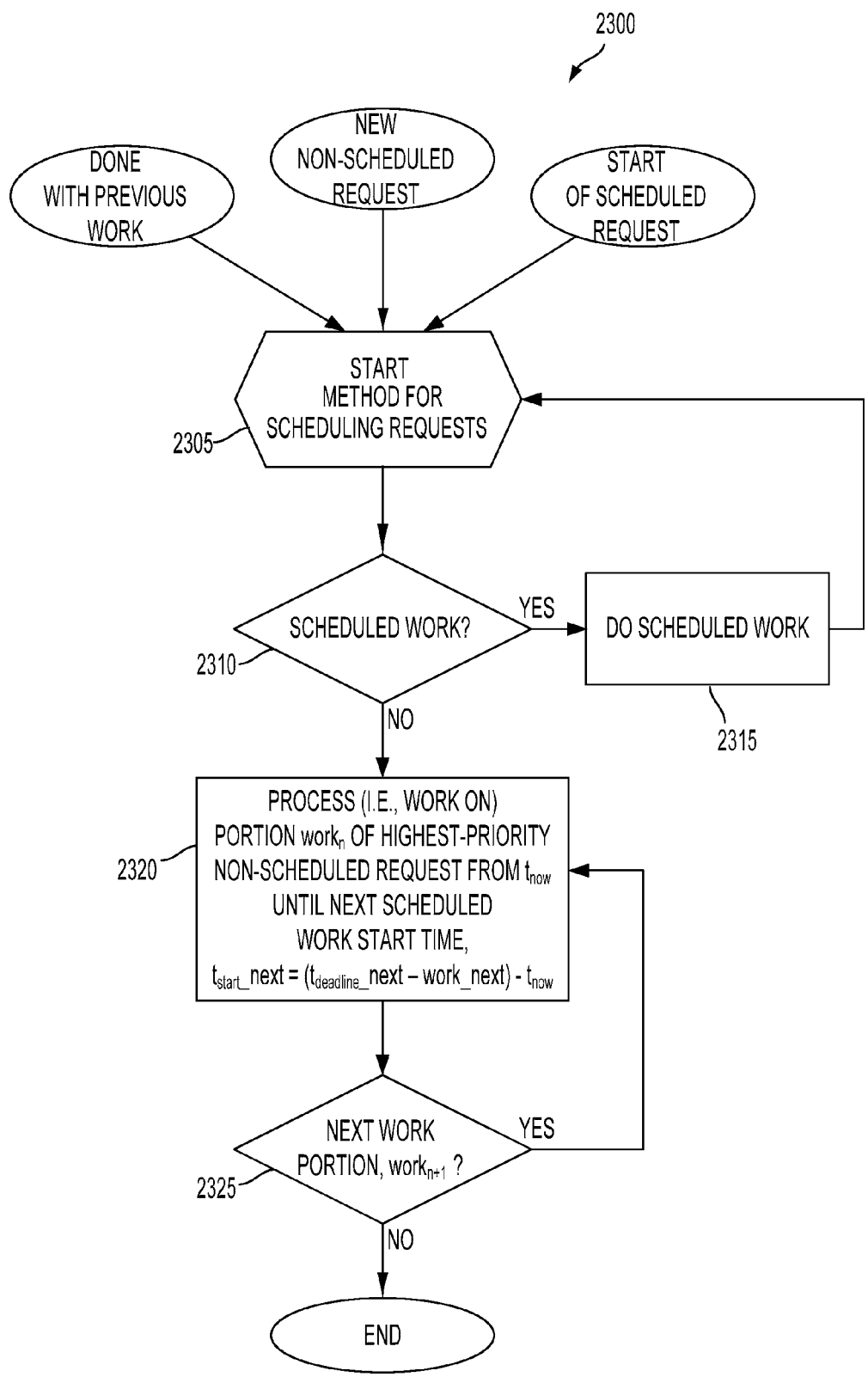
FIG. 23 is a logical flowchart illustrating a method for scheduling the processes associated with handling multiple requests for resource state set transitions.

FIG. 23 is a logical flowchart illustrating a method 2300 for scheduling the processing of resource state transitions. The method 2300 conveys more generally the concept that more than two requests, which may be scheduled or non-scheduled, may need to be processed concurrently. (For purposes of clarity, the methods described above with regard to FIGS. 11-22 relate to processing of only one or two requests and the possibility of conflict conditions between them.)

The method 2300 begins in a state 2305, which may be reached as a result of any of the following conditions having occurred: the controller 101 is done with the processing or work involved in transitioning resource states in response to a request; the controller 101 receives a non-scheduled request for a resource state set transition; or the controller 101 determines that a scheduled start time ("$t_{start}$") for processing resource state transitions is imminent. In block 2310, which represents the beginning of the method 2300, the controller 101 determines whether any processing or work has been scheduled. As described above, such processing or work may be scheduled to start at periodic intervals, though the scheduled start time may be modified to alleviate conflict conditions.

If the controller 101 determines that it is time ("$t_{now}$") to perform such scheduled processing or work, then the controller 101 performs the processing or work as indicated by block 2315. If the controller 101 determines that it is not time to perform any scheduled processing or work, then the controller 101 may process any non-scheduled request that is pending, as indicated by block 2320. There may be more than one non-scheduled request pending. Also, non-scheduled requests may have priority levels associated with them. If more than one non-scheduled request is pending, then the controller 101 works on the portion of the highest-priority pending non-scheduled request from that time until the next scheduled work start time ($t_{start}$). The next start time, $t_{start}$ next, is:

$$t_{start\_}\text{next} = (t_{deadline\_}\text{next} - \text{work\_next}) - t_{now}.$$

Note that $t_{start\_}$next in the above calculation is relative to $t_{now}$.

When the controller 101 completes processing or working on a portion (see FIG. 19) of the work associated with a non-scheduled request, controller 101 whether the processing or work includes further portions, as indicated by block 2325. If further portions exist, then the controller 101 works on the next portion in the same manner as described above with regard to block 2320. The term "highest-priority" above refers to a prioritization scheme that may be included in some embodiments. For example, a non-scheduled request that results from a user "turning off" the PCD 100, i.e., initiating a low-power state through the touchscreen 132 (FIG. 1), may be assigned a lower priority than other non-scheduled requests.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the disclosed system and method. In some instances, certain steps may be omitted or not performed without departing from the method as understood by one of ordinary skill in the art. Further, words such as "thereafter", "then", "next", etc. are not intended to limit the order of the steps. These words are simply used to guide the reader through the description of the exemplary method.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawing figures, which may illustrate various process flows.

In one or more exemplary aspects, the functions described may be implemented in hardware, software, firmware, or any combination thereof. If implemented in software, the functions may be stored as one or more instructions or code on a computer-readable medium. A computer-readable medium may include any available non-transitory media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing application states of a portable computing device having a plurality of processors and a corresponding plurality of processor resources, comprising:
    maintaining in a memory a first processor resource state set and a second processor resource state set for a first processor;
    issuing a request to a controller for the first processor operating in a first application state to transition from the first application state to a second application state by the controller, wherein the first application state corresponds to the first processor resource state set and the second application state corresponds to the second processor resource state set;
    scheduling by the controller a start time to begin transitioning processor resources from the first application state to the second application state based upon an estimated amount of processing time for the controller to complete transitioning processor resources from the first application state to the second application state, wherein scheduling the start time comprises determining whether a resource state transition conflict condition exists between a first process of switching states associated with a first request issued for the first processor and a second process of switching states associated with a second request issued for a second processor and, if it is determined that the resource state transition conflict condition exists, alleviating the resource state transition conflict condition by modifying one of the start time of the first process and another start time of the second process so that a first portion of the first process is performed before any of the second process is performed, and a second portion of the first process is performed after at least a portion of the second process is performed, wherein no portions of the first process and the second process are performed simultaneously; and
    at the scheduled start time, the controller beginning a process of switching states of one or more processor resources from the first application state to the second application state,
    wherein scheduling the start time to begin transitioning processor resources from the first application state to the second application state for the first processor is performed by the controller such that the process of the controller switching states of one or more processor resources from the first application state to the second application state does not occur during the process of the controller switching states of one or more processor resources for any other processor other than the first processor in the portable computing device.

2. The method of claim 1, wherein:
    the first processor resource state set is a sleep resource state set corresponding to a sleep application state of the first processor; and
    the second processor resource state set is an active resource state set corresponding to an active application state of the first processor.

3. The method of claim 1, wherein the portable computing device comprises at least one of: a cellular telephone, a satellite telephone, a pager, a personal digital assistant (PDA), a smartphone, a navigation device, a smartbook or reader, a media player, and a laptop computer with a wireless connection.

4. A computer system for managing application states of a portable computing device having at least one processor and a plurality of processor resources, the computer system comprising:
    a processing entity operable for:
        maintaining in a memory a first processor resource state set and a second processor resource state set for a first processor;
        issuing a request to a controller for the first processor operating in a first application state to transition from the first application state to a second application state by the controller, wherein the first application state corresponds to the first processor resource state set and the second application state corresponds to the second processor resource state set;
        scheduling by the controller a start time to begin transitioning processor resources from the first application state to the second application state based upon an estimated amount of processing time for the controller to complete transitioning processor resources from the first application state to the second application state, wherein scheduling the start time comprises determining whether a resource state transition conflict condition exists between a first process of switching states associated with a first request issued for the first processor and a second process of switching states associated with a second request issued for a second processor and, if it is determined that the resource state transition conflict condition exists, alleviating the resource state transition conflict condition by modifying one of the start time of the first process and another start time of the second process so that a first portion of the first process is performed before any of the second process is performed and a second portion of the first process is performed after at least a portion of the second process is performed, wherein no portions of the first process and the second process are performed simultaneously; and at the scheduled start time, the controller beginning a process of switching states of one or more processor resources from the first application state to the second application state, wherein scheduling the start time to begin transitioning processor resources from the first application state to the second application state for the first processor is performed by the controller such that the process of the controller switching states of one or more processor resources from the first application state to the second application state does not occur during the process of the controller switching states of one or more processor resources for any other processor other than the first processor in the portable computing device.

5. The computer system of claim 4, wherein:
the first processor resource state set is a sleep resource state set corresponding to a sleep application state of the first processor; and
the second processor resource state set is an active resource state set corresponding to an active application state of the first processor.

6. The computer system of claim 4, wherein the portable computing device comprises at least one of: a cellular telephone, a satellite telephone, a pager, a personal digital assistant (PDA), a smartphone, a navigation device, a smartbook or reader, a media player, and a laptop computer with a wireless connection.

7. A computer system for managing application states of a portable computing device having at least one processor and a plurality of processor resources, the computer system comprising:
means for managing application states of a portable computing device having at least one processor and a plurality of processor resources, comprising:
means for maintaining in a memory a first processor resource state set and a second processor resource state set for a first processor;
means for issuing to a controller a request for the first processor operating in a first application state to transition from the first application state to a second application state by the controller, wherein the first application state corresponds to the first processor resource state set and the second application state corresponds to the second processor resource state set;
means for scheduling by the controller a start time to begin transitioning processor resources from the first application state to the second application state based upon an estimated amount of processing time for the controller to complete transitioning processor resources from the first application state to the second application state, wherein scheduling the start time comprises determining whether a resource state transition conflict condition exists between a first process of switching states associated with a first request issued for the first processor and a second process of switching states associated with a second request issued for a second processor and, if it is determined that the resource state transition conflict condition exists, alleviating the resource state transition conflict condition by modifying one of the start time of the first process and another start time of the second process so that a first portion of the first process is performed before any of the second process is performed, and a second portion of the first process is performed after at least a portion of the second process is performed, wherein no portions of the first process and the second process are performed simultaneously; and means for beginning a process of the controller switching states of one or more processor resources at the scheduled start time from the first application state to the second application state, wherein the means for scheduling schedules the start time to begin transitioning processor resources from the first application state to the second application state for the first processor is performed by the controller such that the process of the controller switching states of one or more processor resources from the first application state to the second application state does not occur during the process of the controller switching states of one or more processor resources for any other processor other than the first processor in the portable computing device.

8. The computer system of claim 7, wherein
the first processor resource state set is a sleep resource state set corresponding to a sleep application state of the first processor; and
the second processor resource state set is an active resource state set corresponding to an active application state of the first processor.

9. The computer system of claim 7, wherein the portable computing device comprises at least one of: a cellular telephone, a satellite telephone, a pager, a personal digital assistant (PDA), a smartphone, a navigation device, a smartbook or reader, a media player, and a laptop computer with a wireless connection.

10. A computer program product comprising a computer usable non-transitory medium having a computer readable program code embodied therein, said computer readable program code adapted to be executed to implement a method for managing application states of a portable computing device having at least one processor and a plurality of processor resources, said method comprising:
maintaining in a memory a first processor resource state set and a second processor resource state set for a first processor;
issuing a request to a controller for the first processor operating in a first application state to transition from the first application state to a second application state by the controller, wherein the first application state corresponds to the first processor resource state set and the second application state corresponds to the second processor resource state set;
scheduling by the controller a start time to begin transitioning processor resources from the first application state to the second application state based upon an estimated amount of processing time for the controller to complete transitioning processor resources from the first application state to the second application state, wherein scheduling the start time comprises determining whether a resource state transition conflict condition exists between a first process of switching states associated with a first request issued for the first processor and a second process of switching states associated with a second request issued for a second processor and, if it is determined that the resource state transition conflict condition exists, alleviating the resource state transition conflict condition by modifying one of the start time of the first process and another start time of the second process so that a first portion of the first process is performed before any of the second process is performed, and a second portion of the first process is performed after at least a portion of the second process is performed, wherein no portions of the first process and the second process are performed simultaneously; and at the scheduled start time, the controller beginning a process of switching states of one or more processor resources from the first application state to the second application state, wherein scheduling the start time to begin transitioning processor resources from the first application state to the second application state for the first processor is performed by the controller such that the process of the controller switching states of one or more processor resources from the first application state to the second application state does not occur during the process of the controller switching states of one or more processor resources for any other processor other than the first processor in the portable computing device.

11. The computer program product of claim 10, wherein the first processor resource state set is a sleep resource state set corresponding to a sleep application state of the first processor; and the second processor resource state set is an active resource state set corresponding to an active application state of the first processor.

12. The computer program product of claim 10, wherein the portable computing device comprises at least one of: a cellular telephone, a satellite telephone, a pager, a personal digital assistant (PDA), a smartphone, a navigation device, a smartbook or reader, a media player, and a laptop computer with a wireless connection.

\* \* \* \* \*